United States Patent
Mataga et al.

(10) Patent No.: US 8,458,902 B2
(45) Date of Patent: Jun. 11, 2013

(54) METHOD OF FORMING CAM SHAFT

(75) Inventors: Akira Mataga, Toyohashi (JP);
Tomoyuki Fujita, Toyohashi (JP)

(73) Assignee: Musashi Seimitsu Industry Co., Ltd., Toyohashi-Shi (JP)

( * ) Notice: Subject to any disclaimer, the term of this patent is extended or adjusted under 35 U.S.C. 154(b) by 659 days.

(21) Appl. No.: 12/314,496

(22) Filed: Dec. 11, 2008

(65) Prior Publication Data
US 2009/0165297 A1    Jul. 2, 2009

(30) Foreign Application Priority Data

Dec. 28, 2007    (JP) .................................. 2007-340671

(51) Int. Cl.
*B21D 53/84*    (2006.01)

(52) U.S. Cl.
USPC ........................................................ 29/888.1

(58) Field of Classification Search
USPC ...................... 29/888.1; 123/90.17
See application file for complete search history.

(56) References Cited

U.S. PATENT DOCUMENTS

| 4,783,898 A | * | 11/1988 | Kanamaru et al. | ............... | 29/523 |
| 7,314,031 B2 | * | 1/2008 | Le Troadec et al. | ......... | 123/90.6 |

FOREIGN PATENT DOCUMENTS

| FR | 2 630 790 A1 | 11/1989 |
| JP | A-61-074965 | 4/1986 |
| JP | A-04-334706 | 11/1992 |
| JP | A-05-050163 | 3/1993 |
| JP | A-06-190479 | 7/1994 |
| JP | A-09-096202 | 4/1997 |

OTHER PUBLICATIONS

Jan. 10, 2012 Office Action issued in Japanese Patent Application No. 2007-340671; with English-language translation.
Sep. 24, 2012 Office Action issued in Japanese Patent Application No. 2007-340671; with English-language translation.

* cited by examiner

*Primary Examiner* — David Bryant
*Assistant Examiner* — Moshe Wilensky
(74) *Attorney, Agent, or Firm* — Oliff & Berridge, PLC

(57) ABSTRACT

The present invention relates to a method of forming a cam shaft by assembling a preliminary shaft having a predetermined outer diameter and a cam lobe including a cam-lobe shaft hole having a diameter larger than the outer diameter of the preliminary shaft. The method comprises: a one-side projecting-part forming step in which a one-side projecting part for fixing a one-side surface of the cam lobe is previously formed on an axially predetermined position of the preliminary shaft; an inserting step in which the preliminary shaft is inserted into the cam-lobe shaft hole of the cam lobe from a side of the preliminary shaft on which the one-side projecting part has not been formed; a temporary fixing step in which the cam lobe and the preliminary shaft are temporarily fixed to each other, by pressing the one-side surface of the inserted cam lobe against the one-side projecting part, such that the cam lobe and the preliminary shaft are circumferentially positioned; and an other-side projecting-part forming step in which an other-side projecting part for fixing an other-side surface of the cam lobe is formed on an outer circumferential part of the preliminary shaft near the other-side surface of the cam lobe that has been temporarily fixed.

18 Claims, 24 Drawing Sheets

METHOD OF FORMING CAM SHAFT

FIELD OF THE INVENTION

The present invention relates to a method of forming a cam shaft, which is used in, e.g., an engine of an automobile.

BACKGROUND ART

There has been known a conventional method of forming a cam shaft, in which, after a preliminary shaft is inserted into a cam-lobe shaft hole of a cam lobe, the preliminary shaft having a diameter smaller than that of the cam-lobe shaft hole, a side projecting part is formed on an outer circumference of the preliminary shaft positioned near a side surface of the cam lobe, the side projecting part having a diameter larger than that of the cam-lobe shaft hole, so that the cam lobe and the preliminary shaft are assembled to each other (FR-2630790-A).

There has been known another method of forming a cam shaft, in which a shaft-hole projecting part is previously formed on an area, which is to be opposed to the inner surface of a cam-lobe shaft hole (an area corresponding to an axial length of the cam-lobe shaft hole), of the outer circumference of a preliminary shaft, the shaft-hole projecting part having a diameter larger than that of the cam-lobe shaft hole, and the shaft-hole projecting part is press-inserted into the cam-lobe shaft hole, so that the cam lobe and the preliminary shaft are assembled to each other (see, JP9-96202A).

There has been known still another method of forming a cam shaft, in which a cam lobe is heated so as to increase a diameter of a cam-lobe shaft hole by thermal expansion, a preliminary shaft, which has a diameter smaller than that of the cam-lobe shaft hole which has been increased, is inserted into the cam-lobe shaft hole whose diameter has been increased, and then the cam lobe is cooled so as to decrease the diameter of the cam-robe shaft hole, so that the cam lobe and the preliminary shaft are assembled to each other JP4-334706A).

SUMMARY OF THE INVENTION

In the method of forming a cam shaft described in FR-2630790-A, when the cam lobe and the preliminary shaft are assembled to each other, it is necessary to circumferentially position the cam lobe and the preliminary shaft to form a predetermined angle therebetween. It can be considered that the cam lobe and the preliminary shaft are fitted to each other by using patterns that have been previously carved in both the cam lobe and the preliminary shaft (see, FIG. 5 of FR-2630790-A). However, in this case, in order to improve a positioning precision, a press-insertion load, which is generated when the came lobe and the preliminary shaft are fitted to each other, becomes higher, and thus a larger press-insertion apparatus is required. Alternatively, it can be considered that the circumferential positioning is performed with the use of a positioning member. However, in this case, when the side projecting part is formed (by pressing) on the outer circumference of the preliminary shaft by a pressing member, it is difficult to form the side projecting part having a sufficient fastening force, because the presence of the positioning member disturbs the forming (pressing) process.

In the method of forming a cam shaft described in JP9-96202A, it is necessary to press-insert the shaft-hole projecting part, which has been previously formed on the outer circumference of the preliminary shaft, into the cam-lobe shaft hole over the elongated area corresponding to the axial length of the cam-lobe shaft hole. Namely, the press-insertion load is higher, and thus a larger press-insertion apparatus is required. In addition, since the shaft-hole projecting part is designed at a height capable of being press-inserted into the cam-lobe shaft hole, the fastening force in the axial direction between the preliminary shaft and the cam lobe may not be sufficient.

In the method of forming a cam shaft described in JP4-334706A, since the increase amount of the diameter of the cam-lobe shaft hole by the thermal expansion is small (for example, when a cam lobe having a cam-lobe shaft hole having a 25-mm inner diameter is heated to 200° C., the diameter is increased by about 0.03 mm), the cam-lobe shaft hole and the outer circumference of the preliminary shaft have to be grinded with a predetermined high precision, which complicates the processing step.

The present invention has been made in view of the above circumstances. The object of the present invention is to provide a method of forming a cam shaft in which, when a side projecting part is formed on an outer circumference of a preliminary shaft, a cam lobe and the preliminary shaft can be circumferentially positioned at a predetermined angle therebetween, while a process for forming the side projecting part is not limited at all.

The present invention is a method of forming a cam shaft by assembling a preliminary shaft having a predetermined outer diameter and a cam lobe including a cam-lobe shaft hole having a diameter larger than the outer diameter of the preliminary shaft, the method comprising: a one-side projecting-part forming step in which a one-side projecting part for fixing a one-side surface of the cam lobe is previously formed on an axially predetermined position of the preliminary shaft; an inserting step in which the preliminary shaft is inserted into the cam-lobe shaft hole of the cam lobe from a side of the preliminary shaft on which the one-side projecting part has not been formed; a temporary fixing step in which the cam lobe and the preliminary shaft are temporarily fixed to each other, by pressing the one-side surface of the inserted cam lobe against the one-side projecting part, such that the cam lobe and the preliminary shaft are circumferentially positioned; and an other-side projecting-part forming step in which an other-side projecting part for fixing an other-side surface of the cam lobe is formed on an outer circumferential part of the preliminary shaft near the other-side surface of the cam lobe that has been temporarily fixed.

According to the present invention, since the one-side projecting part is formed before the insertion of the preliminary shaft, the one-side projecting part can be formed with higher degree of freedom. Further, since the one-side surface of the cam lobe that has been inserted in the preliminary shaft is pressed against the one-side projecting part so that the cam lobe and the preliminary shaft are temporarily fixed to each other, the cam lobe and the preliminary shaft can be circumferentially positioned. Under this state, the other-side projecting part is subsequently formed. Thus, no other means is required for circumferentially positioning the cam-lobe and the preliminary shaft. Thus, the other-side projecting part can be formed with higher degree of freedom as well. As a result, there can be easily formed the one-side projecting part and the other-side projecting part capable of realizing a sufficient fastening force between the cam lobe and the preliminary shaft.

Preferably, in the one-side projecting-part forming step, the one-side projecting part is formed by a first pressing member to have a diameter larger than that of the cam-lobe shaft hole, and in the other-side projecting-part forming step, the other-side projecting part is formed by a second pressing member to have a diameter larger than that of the cam-lobe shaft hole.

In this case, preferably, the first pressing member is a member configured to be rotated about an axis that is parallel to an axial direction of the preliminary shaft, and/or the second pressing member is a member configured to be rotated about an axis that is parallel to the axial direction of the preliminary shaft, and in the one-side projecting-part forming step, the first pressing member, while the same is being rotated, presses the axially predetermined position of the preliminary shaft, so that the one-side projecting part having a diameter larger than that of the cam-lobe shaft hole is formed, and/or in the the-other-side projecting-part forming step, the second pressing member, while the same is being rotated, presses another axially predetermined position of the preliminary shaft, so that the other-side projecting part having a diameter larger than that of the cam-lobe shaft hole is formed.

In this case, more preferably, in the one-side projecting-part forming step, the preliminary shaft is held so as to be axially rotated, and is configured to be rotated together with the rotation of the first pressing member, and/or in the the-other-side projecting-part forming step, the preliminary shaft is held so as to be axially rotated, and is configured to be rotated together with the rotation of the second pressing member.

In this case, still more preferably, in the one-side projecting-part forming step, the number of rotations of the preliminary shaft relative to the first pressing member is plural, and/or in the the-other-side projecting-part forming step, the number of rotations of the preliminary shaft relative to the second pressing member is plural.

Alternatively, preferably, in the one-side projecting-part forming step, the preliminary shaft is held so as to be axially rotated, and/or in the the-other-side projecting-part forming step, the preliminary shaft is held so as to be axially rotated, in the one-side projecting-part forming step, the first pressing member presses the axially predetermined position of the preliminary shaft while the preliminary shaft is being rotated, so that the one-side projecting part having a diameter larger than that of the cam-lobe shaft hole is formed, and/or in the the-other-side projecting-part forming step, the second pressing member presses another axially predetermined position of the preliminary shaft while the preliminary shaft is being rotated, so that the other-side projecting part having a diameter larger than that of the cam-lobe shaft hole is formed.

Alternatively, preferably, in the one-side projecting-part forming step, the first pressing member presses the axially predetermined position of the preliminary shaft from a direction that is inclined with respect to a direction perpendicular to an axial direction of the preliminary shaft, so that the one-side projecting part having a diameter larger than that of the cam-lobe shaft hole is formed, and/or in the the-other-side projecting-part forming step, the second pressing member presses another axially predetermined position of the preliminary shaft from a direction that is inclined with respect to a direction perpendicular to the axial direction of the preliminary shaft, so that the other-side projecting part having a diameter larger than that of the cam-lobe shaft hole is formed, In this case, it is easy to increase a projecting amount of the side-projecting part, whereby the fastening force between the cam lobe and the preliminary shaft can be improved.

Alternatively, preferably, in the one-side projecting-part forming step, the first pressing member presses the axially predetermined position of the preliminary shaft from a direction that is inclined with respect to a direction perpendicular to an axial direction of the preliminary shaft, and then is further inclined in a direction of the one surface of the cam lobe, so that the one-side projecting part having a diameter larger than that of the cam-lobe shaft hole is formed, and/or in the the-other-side projecting-part forming step, the second pressing member presses another axially predetermined position of the preliminary shaft from a direction that is inclined with respect to a direction perpendicular to the axial direction of the preliminary shaft, and then is further inclined in a direction of the other surface of the cam lobe, so that the other-side projecting part having a diameter larger than that of the cam-lobe shaft hole is formed.

In this case, it is easy to increase a projecting amount of the side-projecting part, whereby the fastening force between the cam lobe and the preliminary shaft can be improved.

Alternatively, preferably, the first pressing member is a member capable of being rotated about an axis that is parallel to an axial direction of the preliminary shaft and of being moved in the axial direction, and/or the second pressing member is a member capable of being rotated about an axis that is parallel to the axial direction of the preliminary shaft and being moved in the axial direction, and in the one-side projecting-part forming step, the first pressing member, while the same is being rotated, presses the axially predetermined position of the preliminary shaft, and then is further moved in a direction of the one surface of the cam lobe, so that the one-side projecting part having a diameter larger than that of the cam-lobe shaft hole is formed, and/or in the the-other-side projecting-part forming step, the second pressing member, while the same is being rotated, presses another axially predetermined position of the preliminary shaft, and then is further moved in a direction of the other surface of the cam lobe, so that the other-side projecting part having a diameter larger than that of the cam-lobe shaft hole is formed.

In this case, it is easy to increase a projecting amount of the side-projecting part, whereby the fastening force between the cam lobe and the preliminary shaft can be improved.

In addition, in the above method, before the inserting step, there is performed a shaft-hole-projecting-part forming step in which a partial projecting part, which has the same diameter as that of the cam-lobe shaft hole or a diameter larger than that of the cam-lobe shaft hole, is formed at only a partial area of the outer circumferential part of the preliminary shaft opposed to an inner surface of the cam-lobe shaft hole. In this case, it is easy to align a shaft center of the cam lobe with a shaft center of the preliminary shaft, whereby precision of the cam shaft to be formed can be improved.

BEST MODE FOR CARRYING OUT THE INVENTION

Embodiments of the present invention will be described in detail below with reference to the attached drawings.

Figure 1:
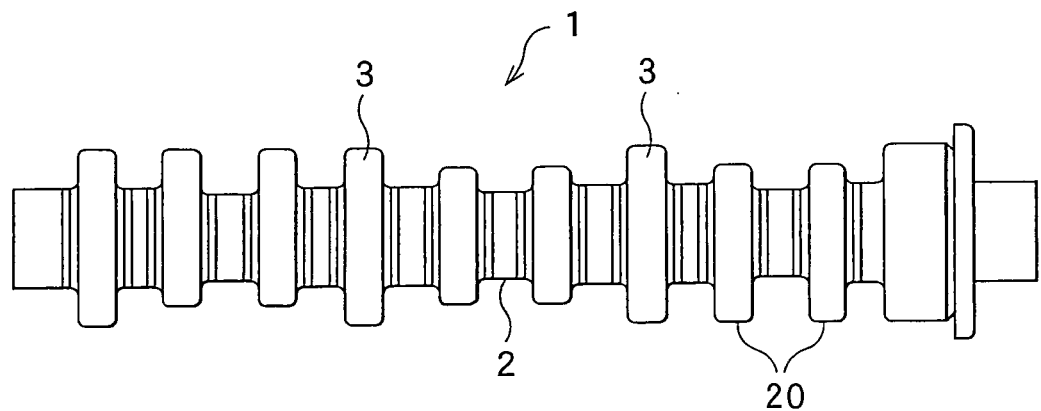
FIG. 1 is a front view of a cam shaft to be formed by a first embodiment of the present invention.
Figure 2A:
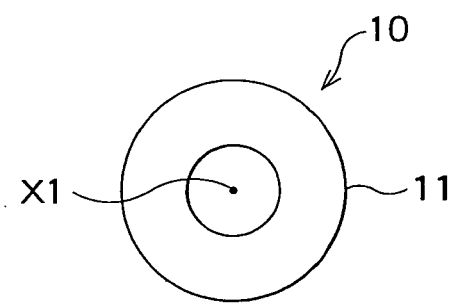
FIG. 2A is a side view of a preliminary shaft to be used in the first embodiment of the present invention.
Figure 2B:
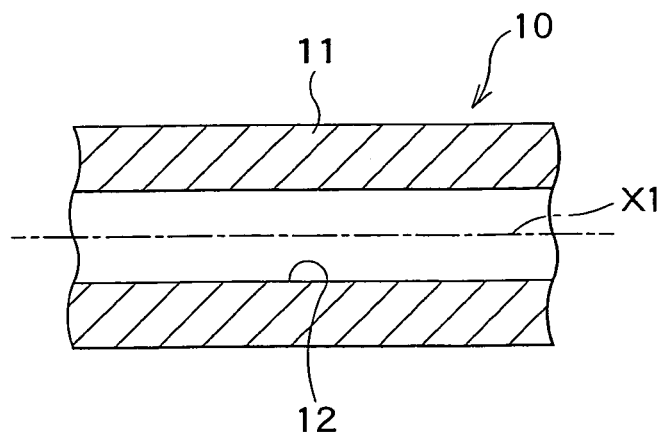
FIG. 2B is a sectional front view of the preliminary shaft.
Figure 3A:
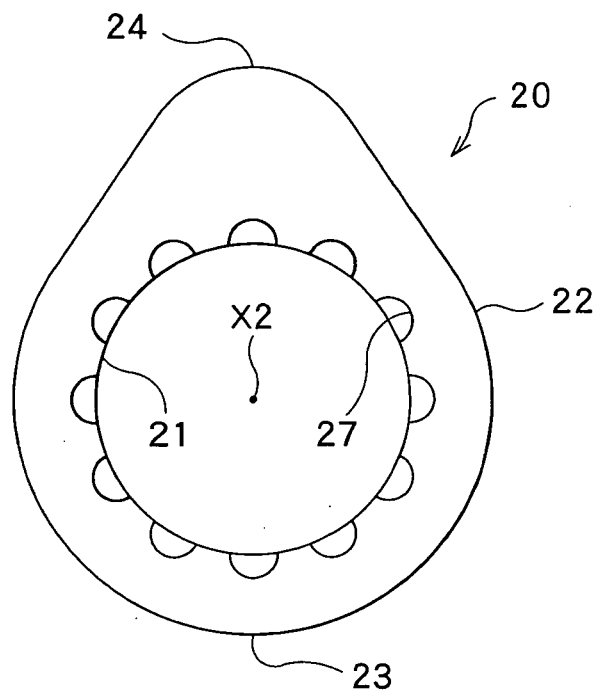
FIG. 3A is a side view of a cam lobe to be used in the first embodiment of the present invention.
Figure 3B:
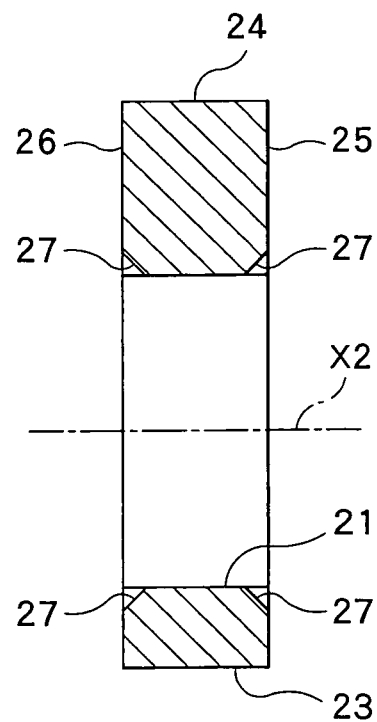
FIG. 3B is a sectional front view of the cam lobe.
Figure 4:
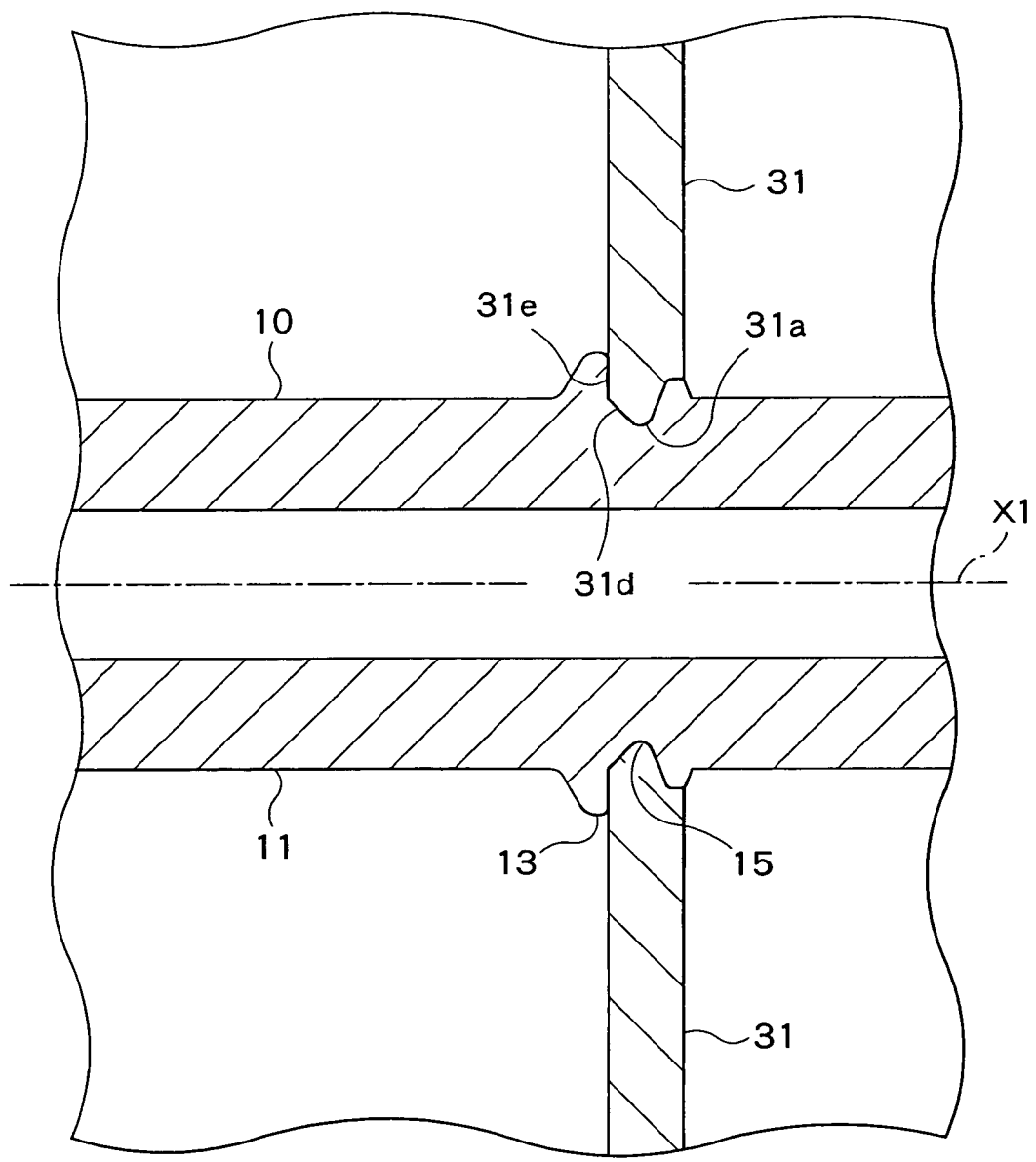
FIG. 4 is a sectional front view showing a state in which an outer circumference of the preliminary shaft is pressed by a pressing member so that a one-side projecting part is formed, in the first embodiment of the present invention.
Figure 5:
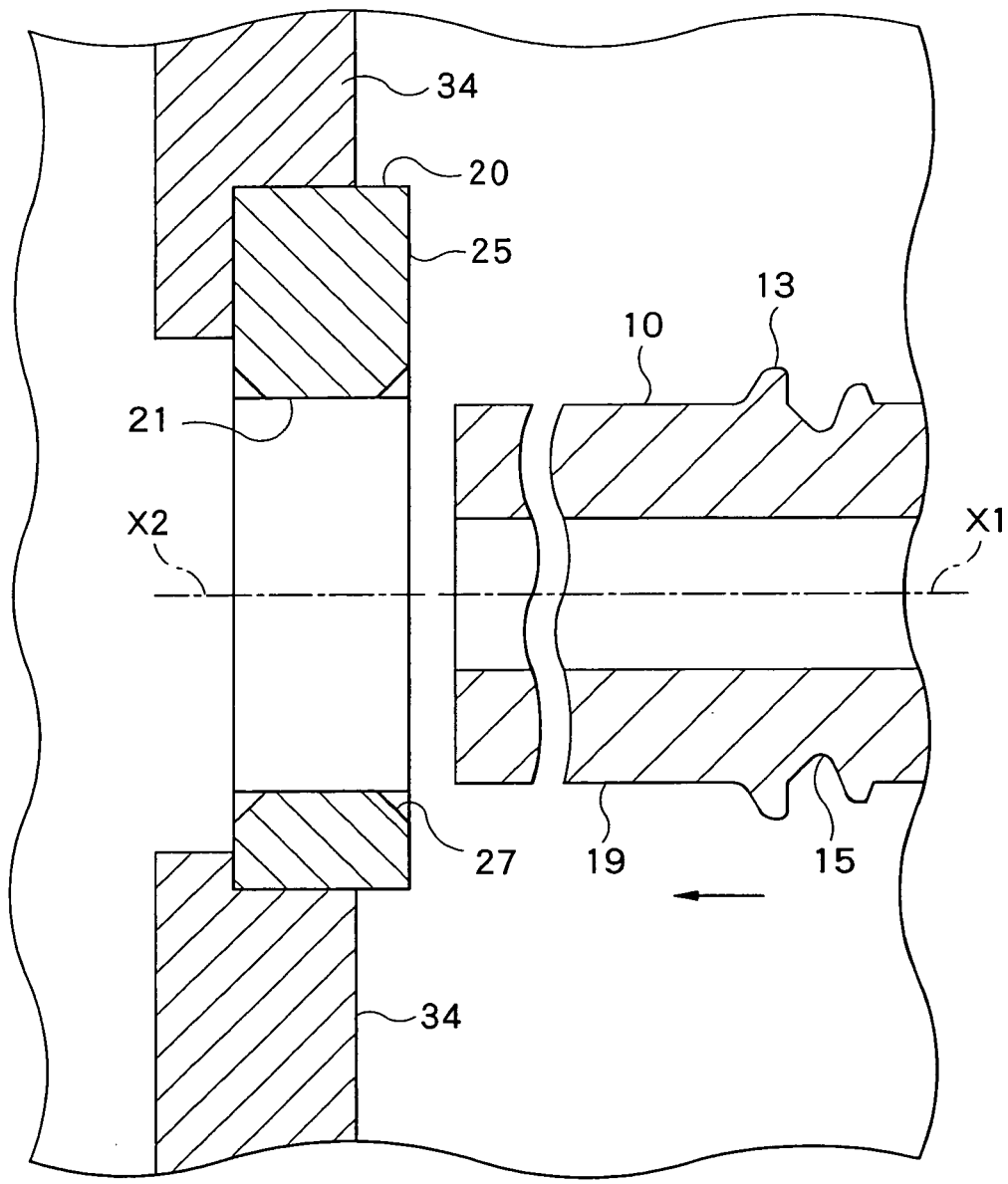
FIG. 5 is a sectional front view showing a state immediately before the preliminary shaft is inserted into a shaft hole of the cam lobe, in the first embodiment of the present invention.
Figure 6:
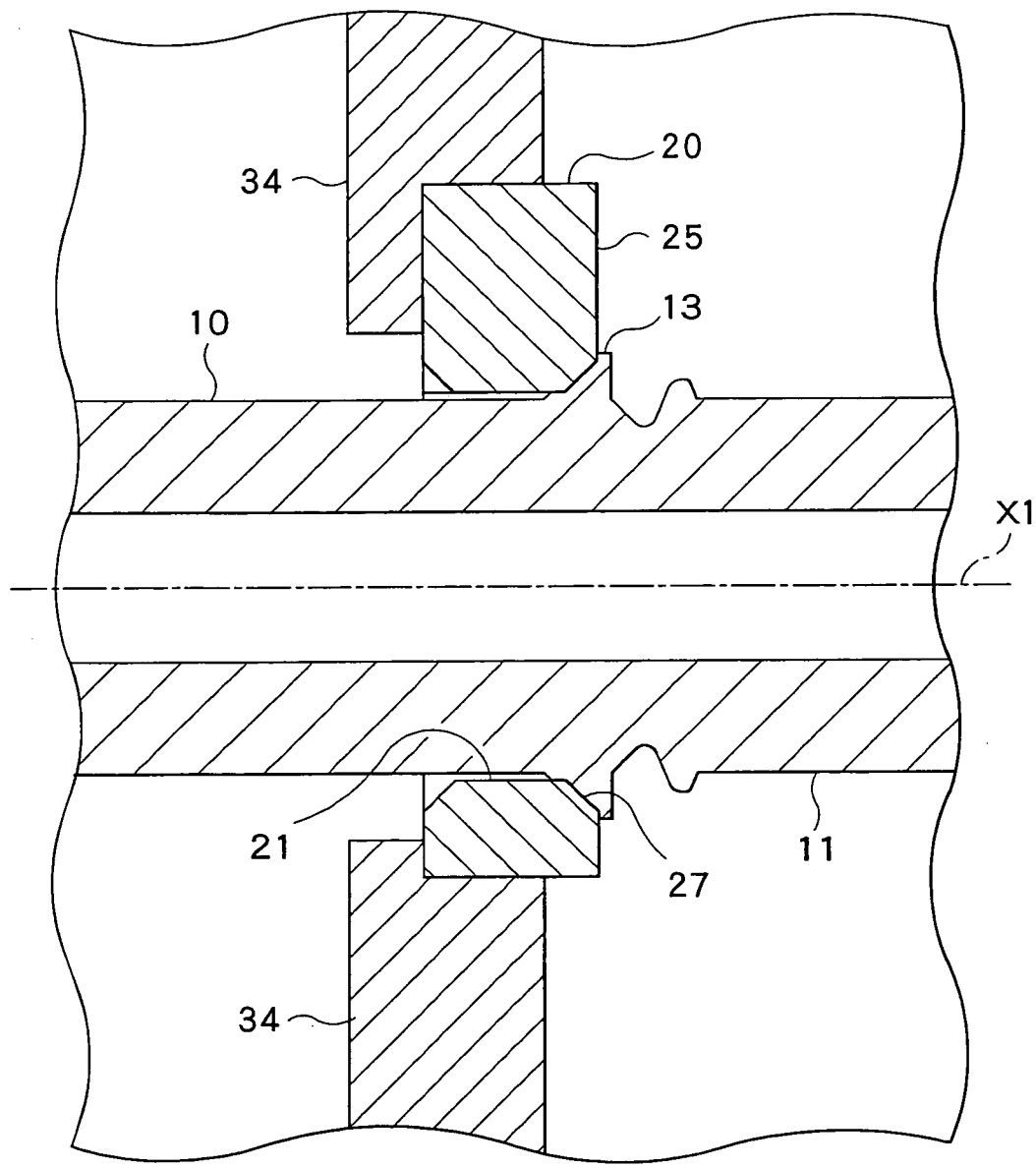
FIG. 6 is a sectional front view showing a state in which the preliminary shaft is inserted in the shaft hole of the cam lobe, with a one-side surface of the cam lobe being pressed onto the one-side projecting part, so that the preliminary shaft and the cam lobe are temporarily fixed to each other, in the first embodiment of the present invention.
Figure 7:
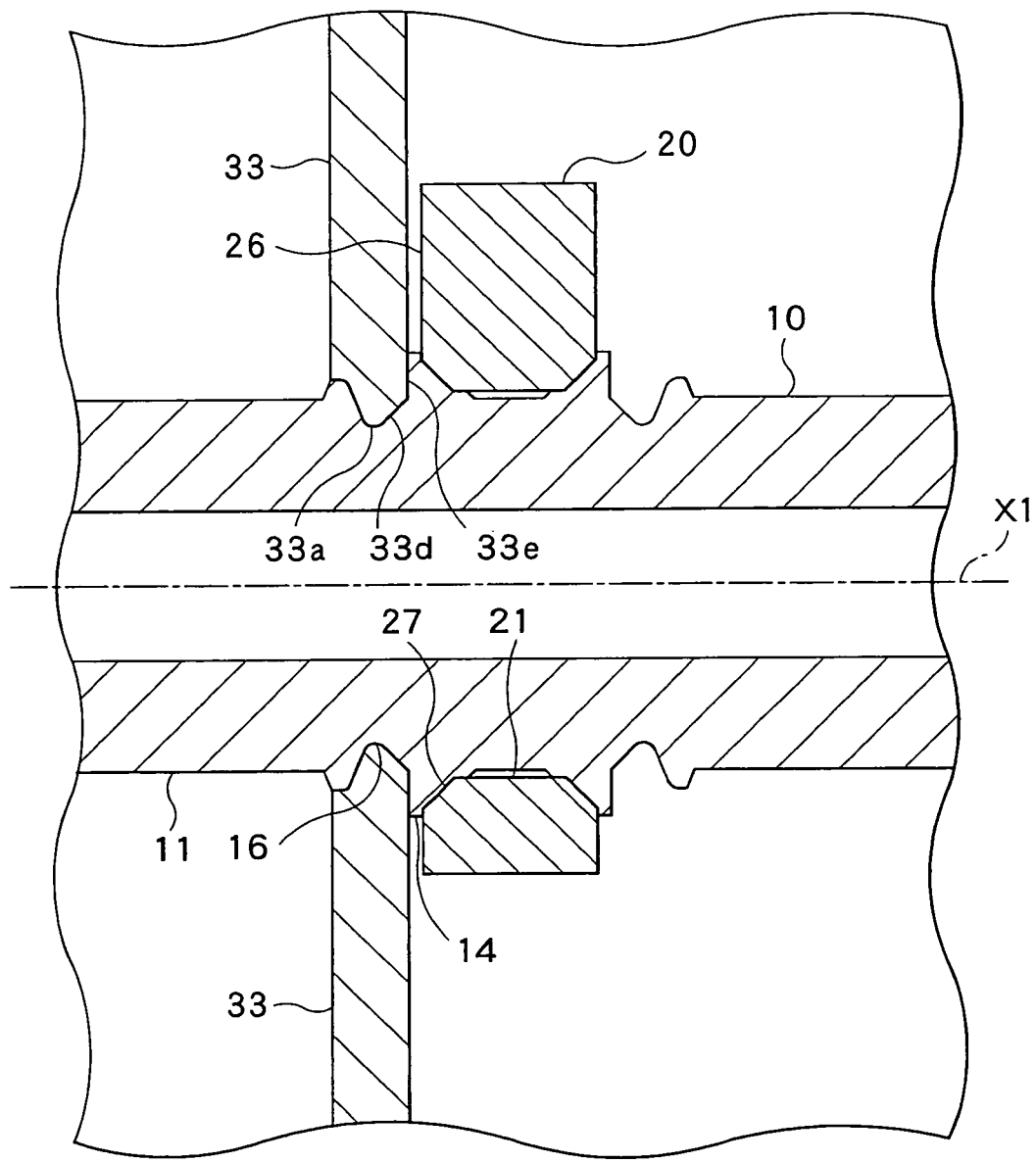
FIG. 7 is a front sectional view showing a state in which the outer circumference of the preliminary shaft is pressed by a pressing member so that an other-side projecting part is formed, in the first embodiment of the present invention.
Figure 8:
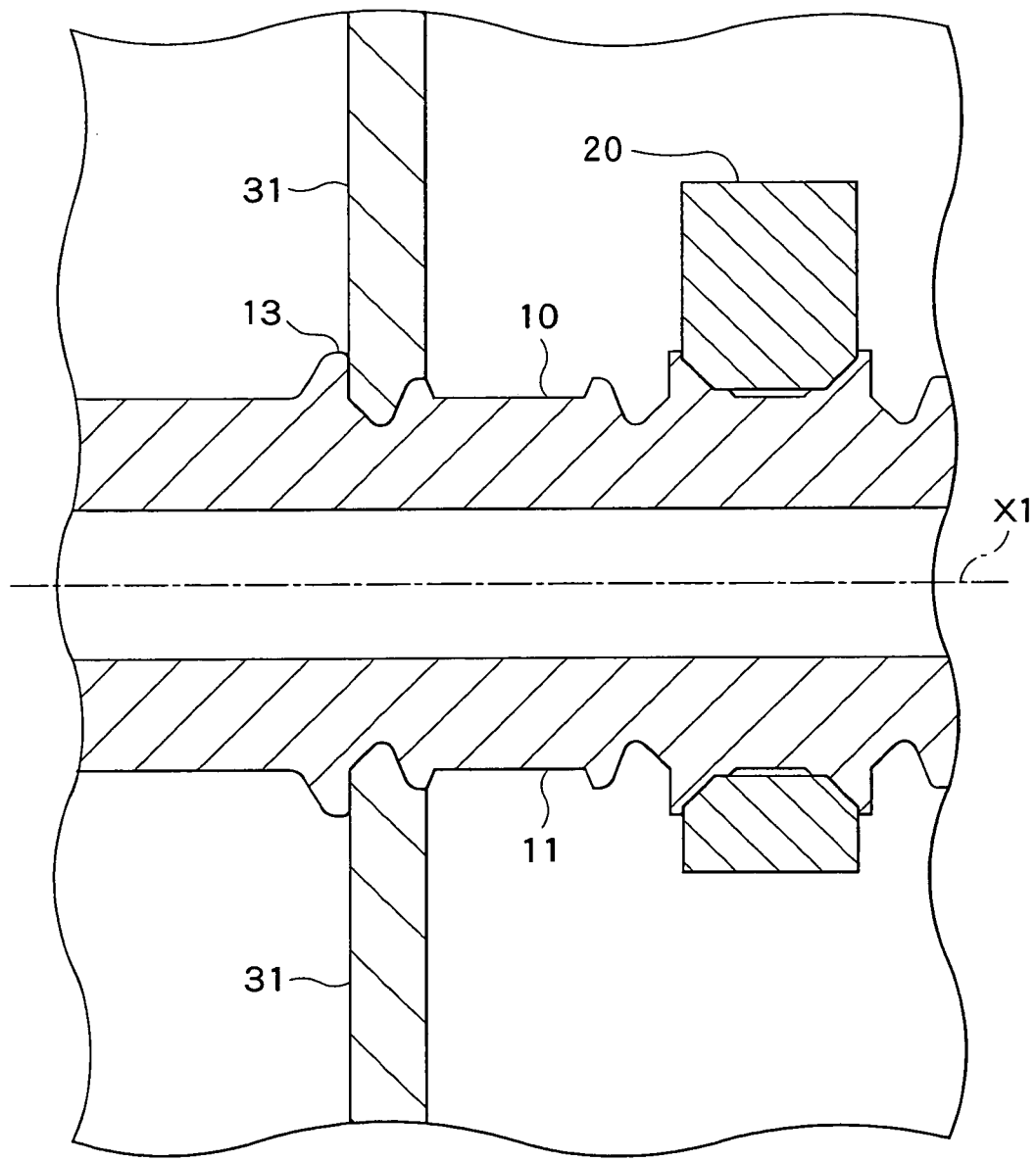
FIG. 8 is a sectional front view showing a state in which the outer circumference of the preliminary shaft is pressed by the pressing member so that a one-side projecting part is formed for a next (adjacent) cam lobe.
Figure 9:
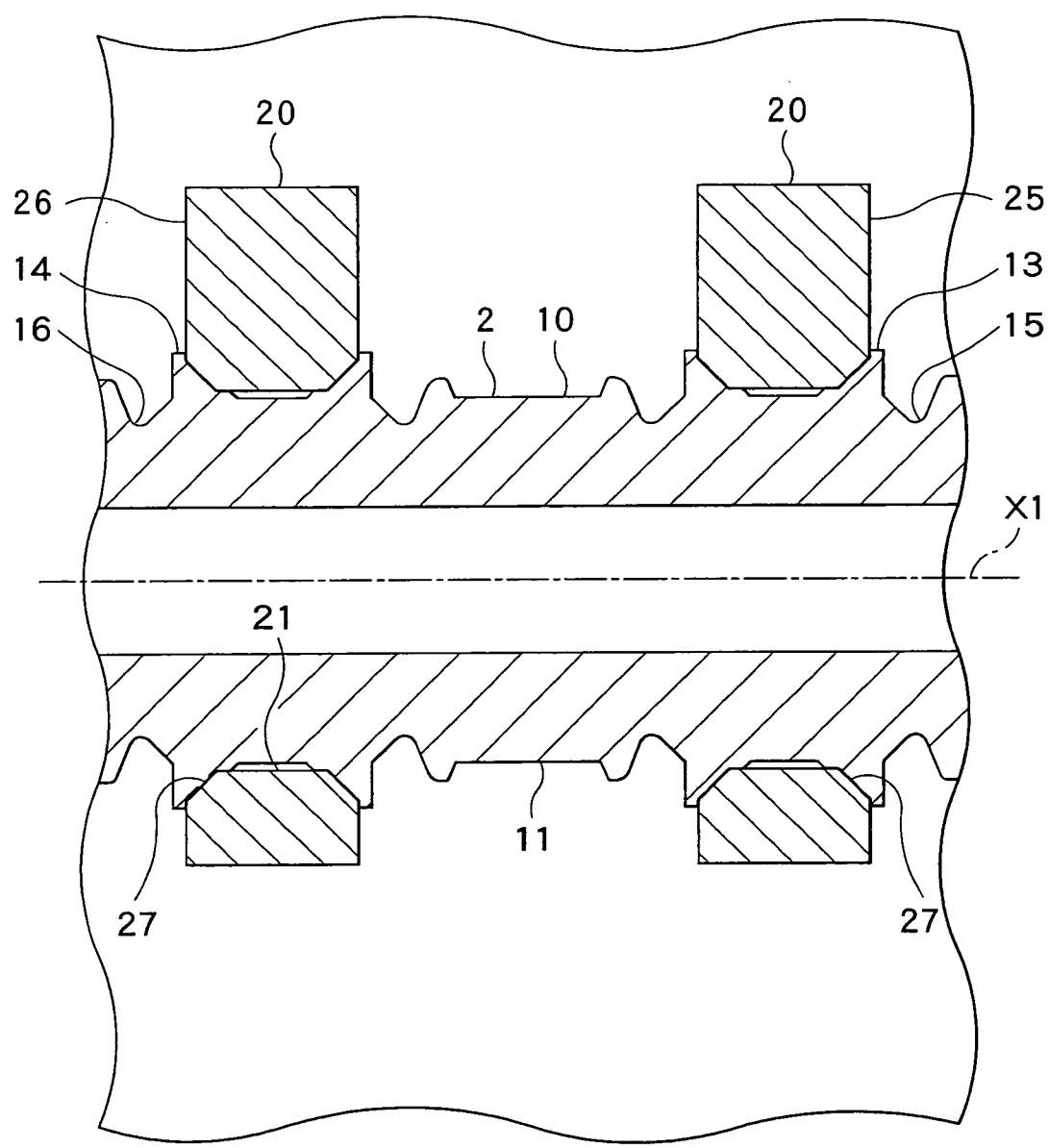
FIG. 9 is a sectional front view showing a state in which a plurality of cam lobes are assembled to the preliminary shaft.
Figure 10:
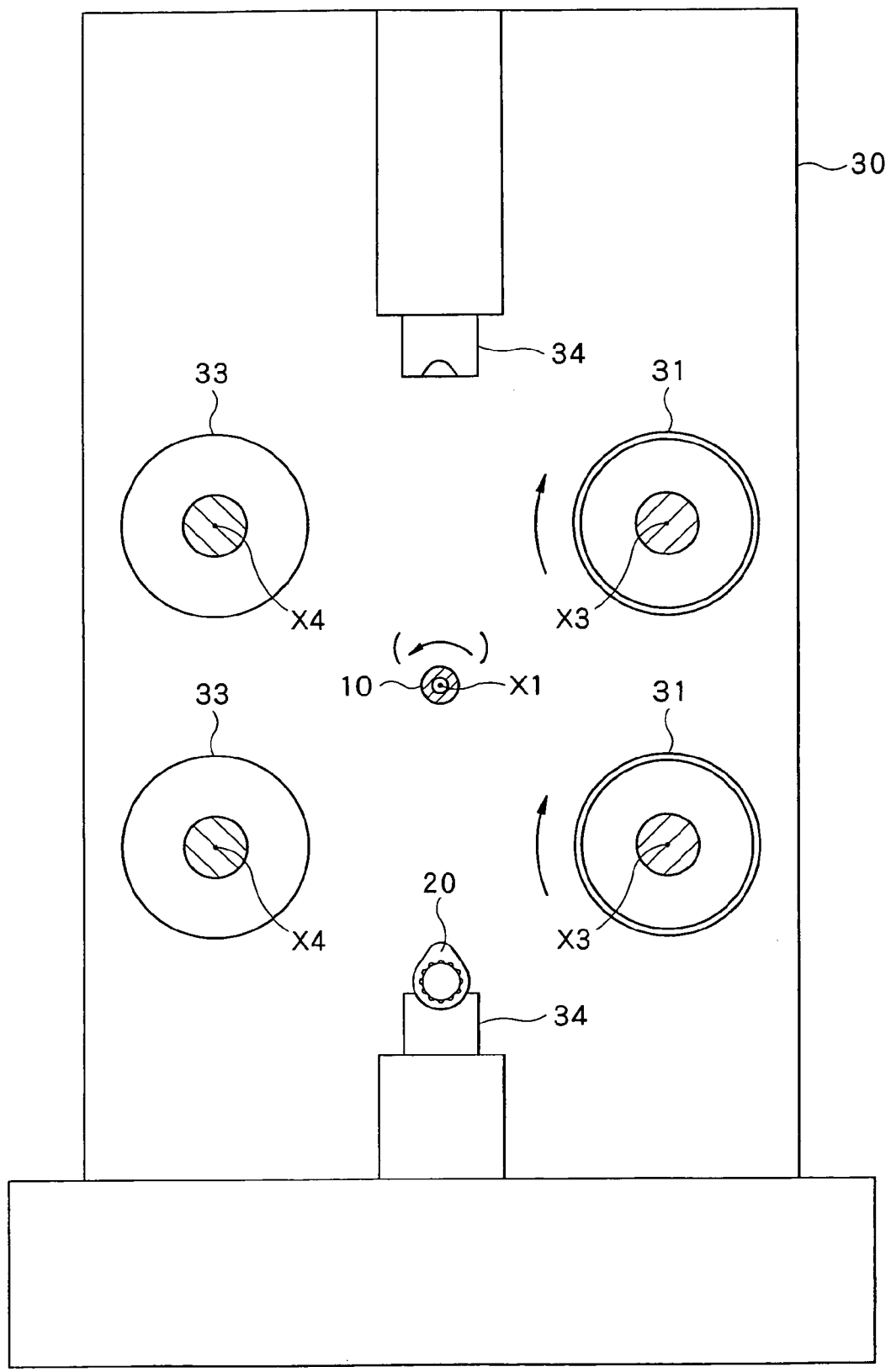
FIG. 10 is a schematic side view of an assembling apparatus for assembling a cam lobe and a preliminary shaft, which is used in the first embodiment of the present invention.
Figure 11:
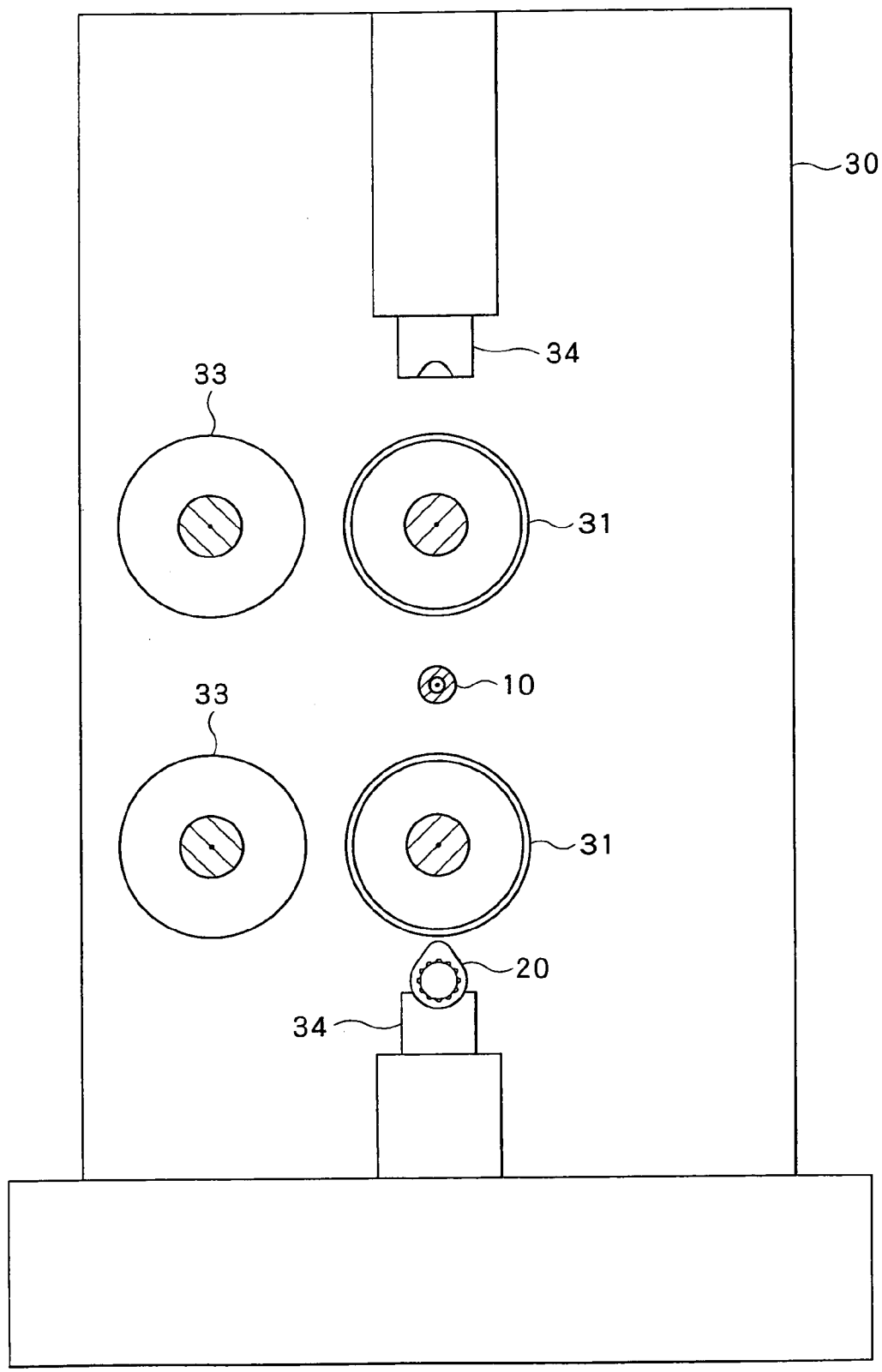
FIG. 11 is a schematic side view of the assembling apparatus under a state immediately before the one-side projecting part is formed on the outer circumference of the preliminary shaft, in the first embodiment of the present invention.
Figure 12:
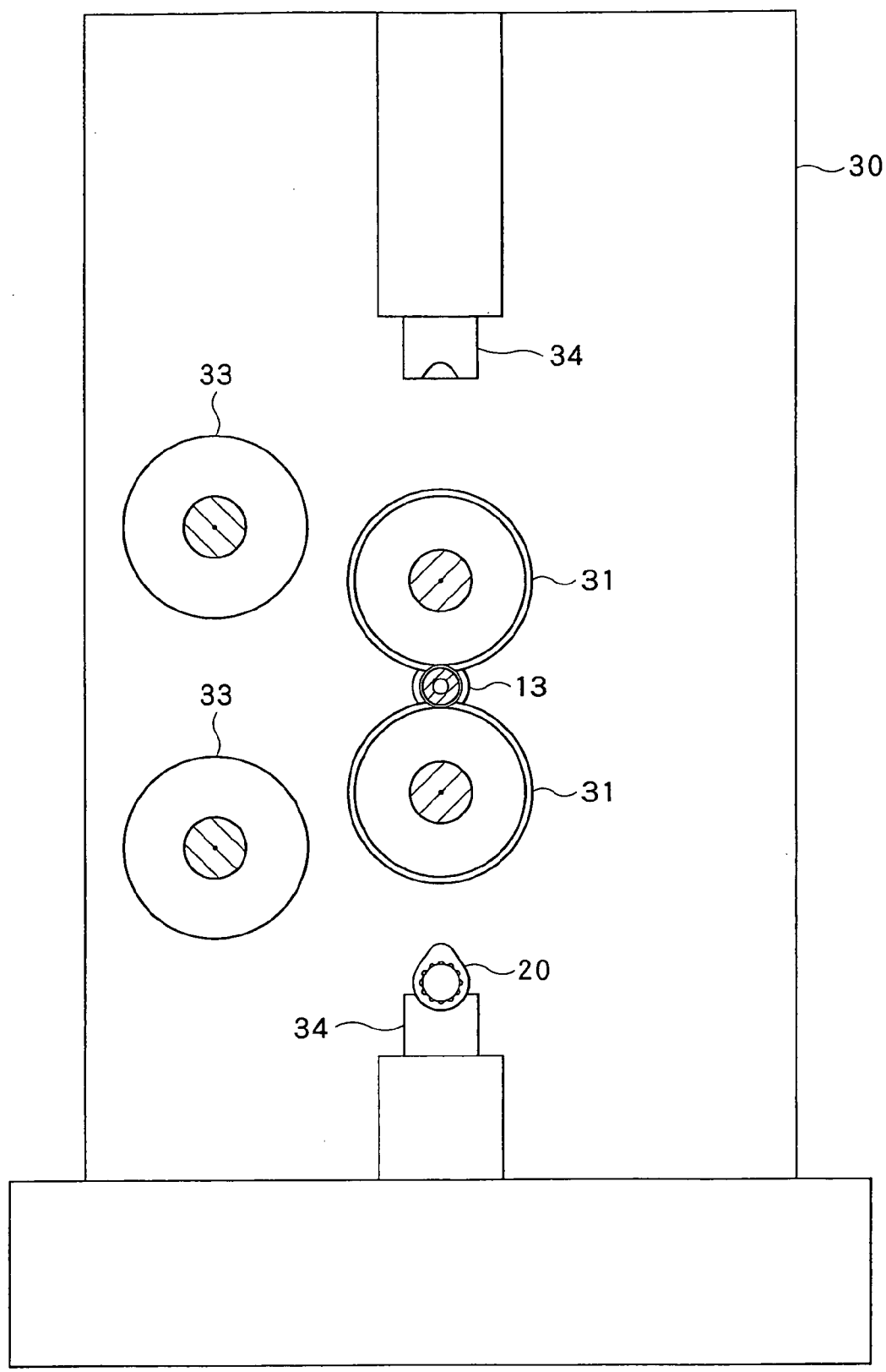
FIG. 12 is a schematic side view of the assembling apparatus under a state in which the one-side projecting part is being formed on the outer circumference of the preliminary shaft, in the first embodiment of the present invention.
Figure 13:
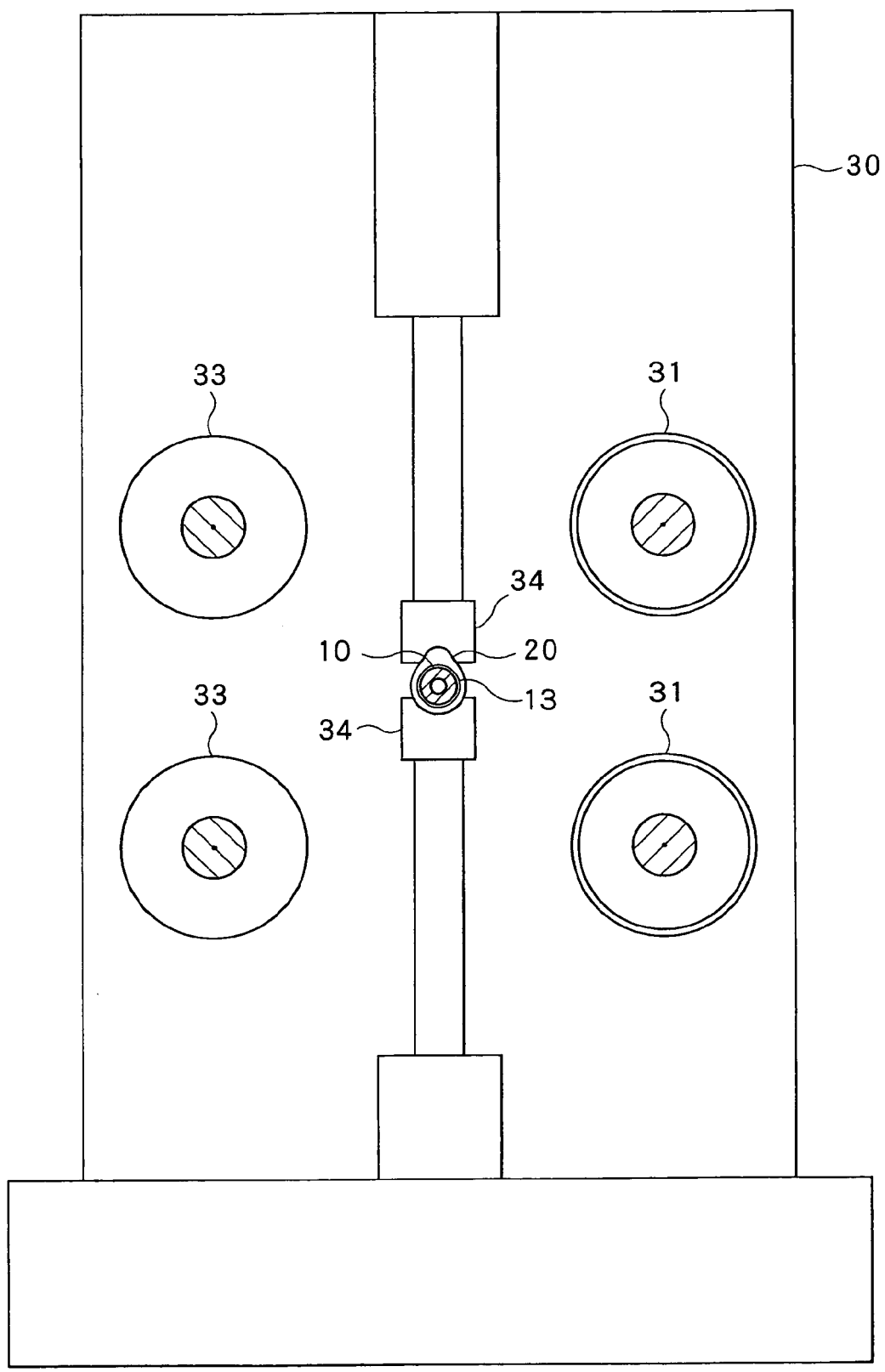
FIG. 13 is a schematic side view of the assembling apparatus under a state in which the preliminary shaft is inserted in the shaft hole of the cam lobe, with the one-side surface of the cam lobe being pressed onto the one-side projecting part, so that the preliminary shaft and the cam lobe are temporarily fixed to each other, in the first embodiment of the present invention.
Figure 14:
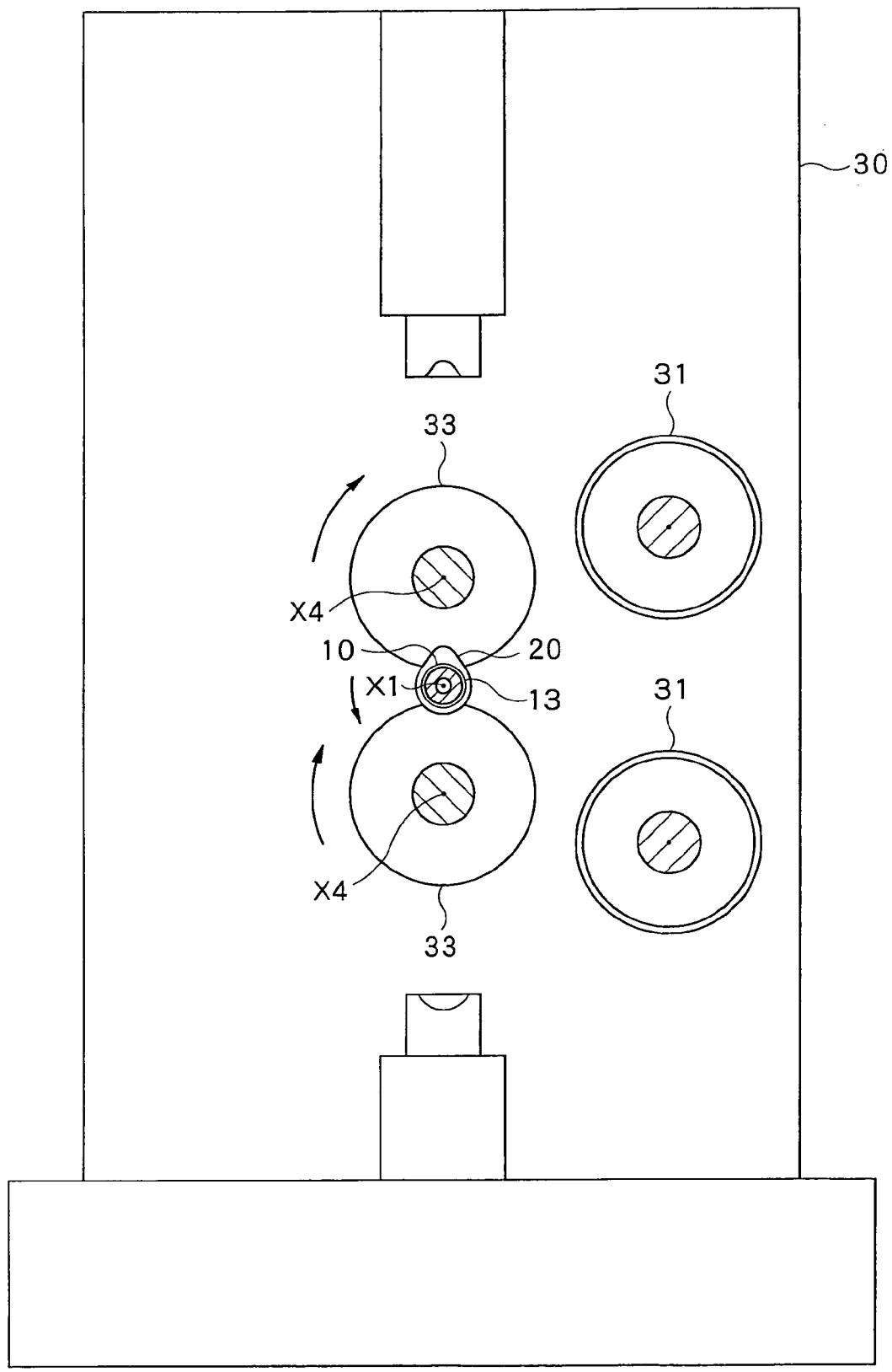
FIG. 14 is a schematic side view of the assembling apparatus under a state in which the other-side projecting part is being formed on the outer circumference of the preliminary shaft, in the first embodiment of the present invention.
Figure 15:
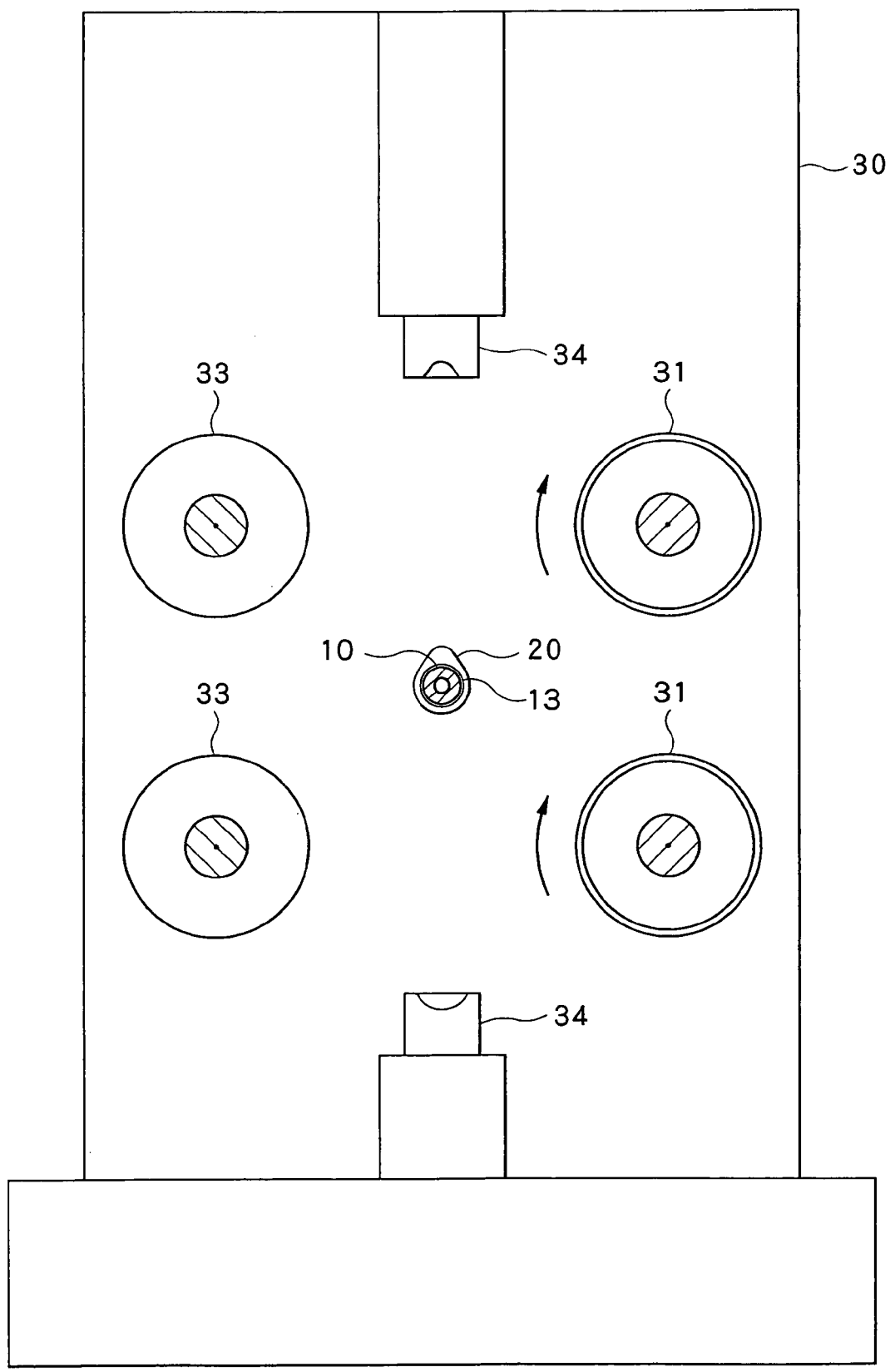
FIG. 15 is a schematic side view of the assembling apparatus under a state in which the cam lobe has been assembled to the preliminary shaft by the first embodiment of the present invention.

FIGS. 1 to 15 relate to a first embodiment. FIG. 1 is a front view of a cam shaft to be formed by a first embodiment of the present invention. FIG. 2A is a side view of a preliminary shaft to be used in the first embodiment of the present invention. FIG. 2B is a sectional front view of the preliminary shaft. FIG. 3A is a side view of a cam lobe to be used in the first embodiment of the present invention. FIG. 3B is a sectional front view of the cam lobe. FIG. 4 is a sectional front view showing a state in which an outer circumference of the preliminary shaft is pressed by a pressing member so that a one-side projecting part is formed, in the first embodiment of the present invention. FIG. 5 is a sectional front view showing a state immediately before the preliminary shaft is inserted into a shaft hole of the cam lobe, in the first embodiment of the present invention. FIG. 6 is a sectional front view showing a state in which the preliminary shaft is inserted in the shaft hole of the cam lobe, with a one-side surface of the cam lobe being pressed onto the one-side projecting part, so that the preliminary shaft and the cam lobe are temporarily fixed to each other, in the first embodiment of the present invention. FIG. 7 is a front sectional view showing a state in which the outer circumference of the preliminary shaft is pressed by a pressing member so that an other-side projecting part is formed, in the first embodiment of the present invention. FIG. 8 is a sectional front view showing a state in which the outer circumference of the preliminary shaft is pressed by the pressing member so that a one-side projecting part is formed for a next (adjacent) cam lobe. FIG. 9 is a sectional front view showing a state in which a plurality of cam lobes are assembled to the preliminary shaft. FIG. 10 is a schematic side view of an assembling apparatus for assembling a cam lobe and a preliminary shaft, which is used in the first embodiment of the present invention. FIG. 11 is a schematic side view of the assembling apparatus under a state immediately before the one-side projecting part is formed on the outer circumference of the preliminary shaft, in the first embodiment of the present invention. FIG. 12 is a schematic side view of the assembling apparatus under a state in which the one-side projecting part is being formed on the outer circumference of the preliminary shaft, in the first embodiment of the present invention. FIG. 13 is a schematic side view of the assembling apparatus under a state in which the preliminary shaft is inserted in the shaft hole of the cam lobe, with the one-side surface of the cam lobe being pressed onto the one-side projecting part, so that the preliminary shaft and the cam lobe are temporarily fixed to each other, in the first embodiment of the present invention. FIG. 14 is a schematic side view of the assembling apparatus under a state in which the other-side projecting part is being formed on the outer circumference of the preliminary shaft, in the first embodiment of the present invention. FIG. 15 is a schematic side view of the assembling apparatus under a state in which the cam lobe has been assembled to the preliminary shaft by the first embodiment of the present invention.

Figure 16:
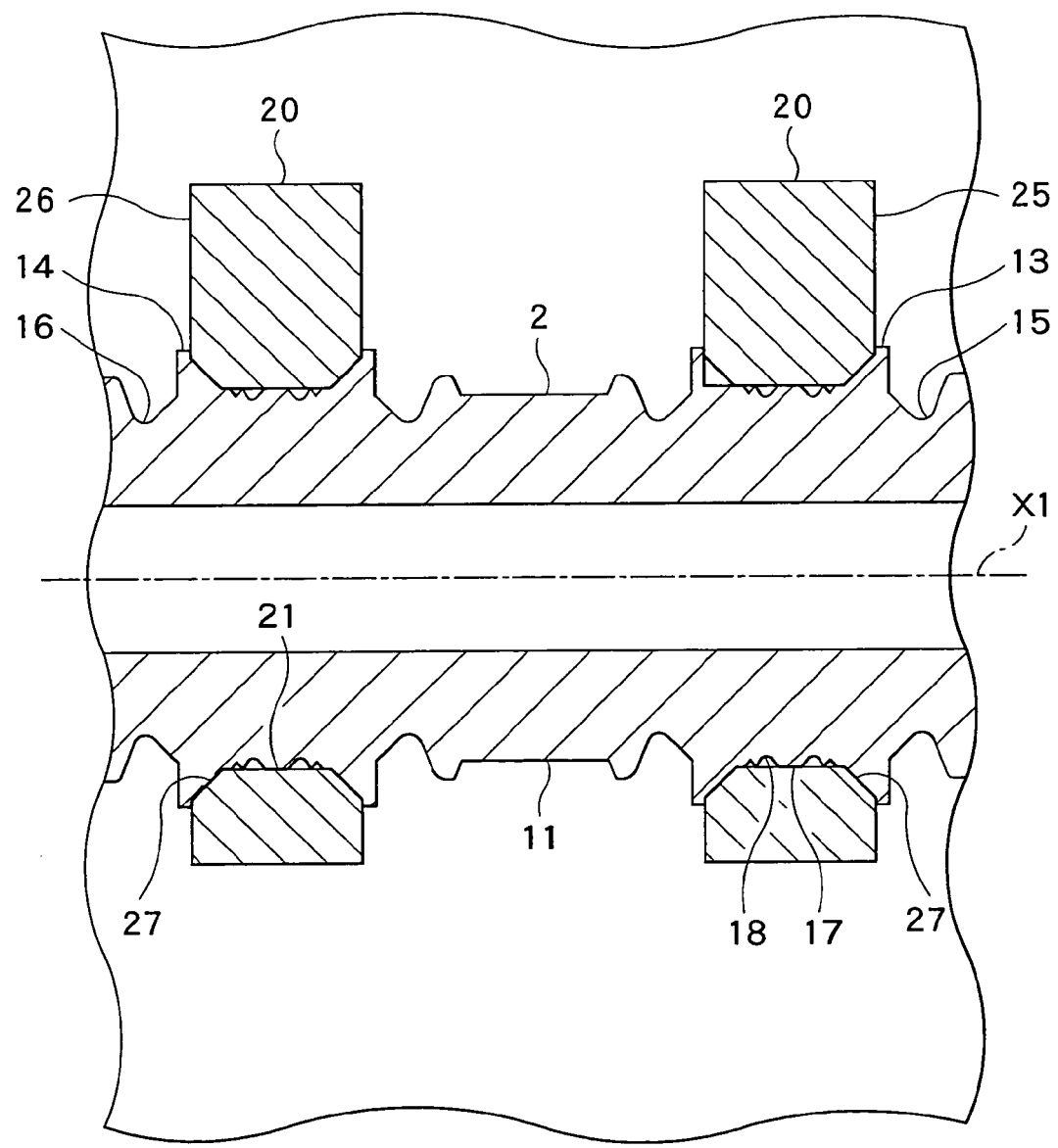
FIG. 16 is a sectional front view showing a state in which a cam lobe has been assembled to a preliminary shaft by a second embodiment of the present invention.
Figure 17:
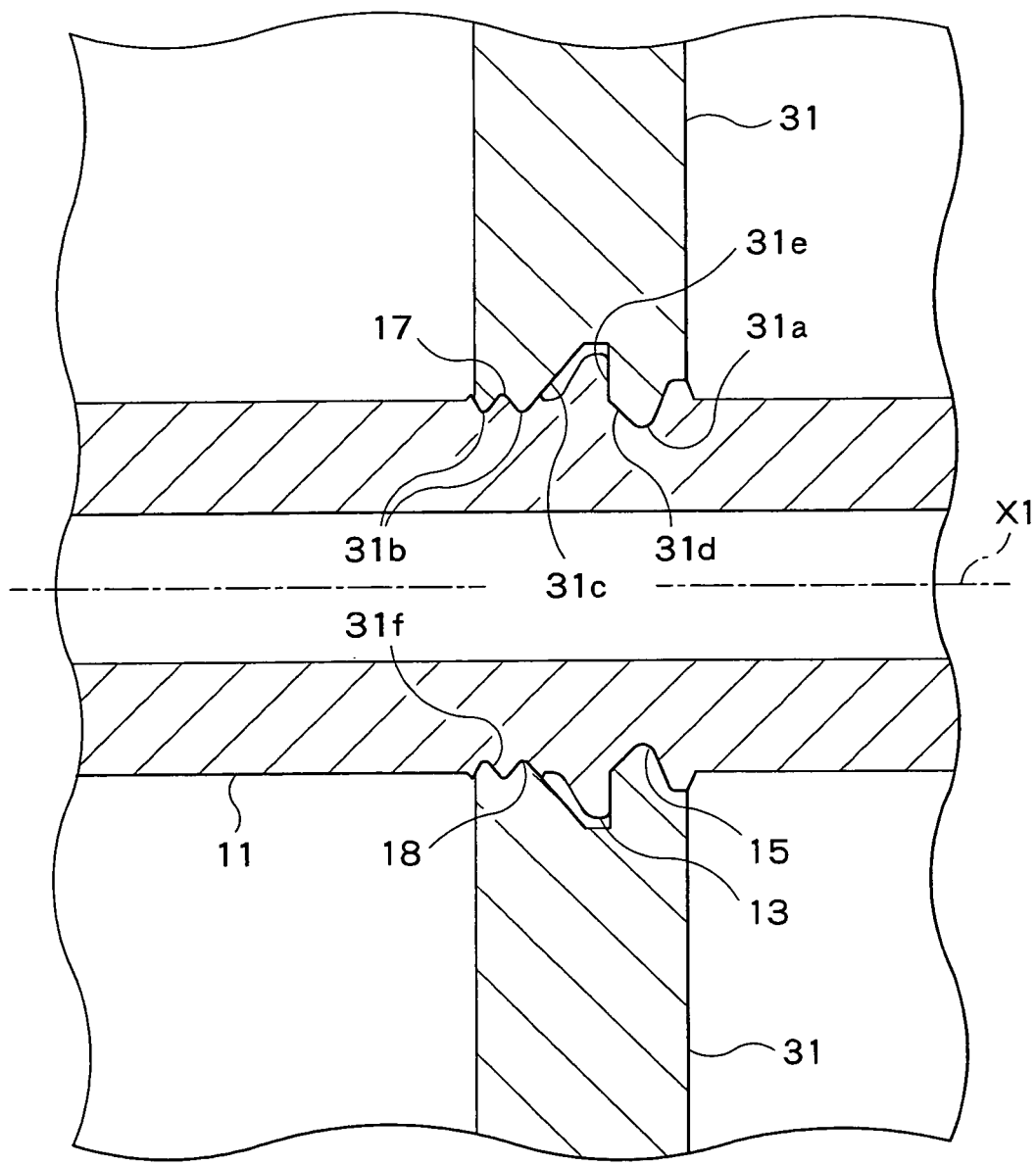
FIG. 17 is a sectional front view showing a state in which an outer circumference of the preliminary shaft is pressed by a pressing member so that an other-side projecting part and a partial projecting part are formed, in the second embodiment of the present invention.
Figure 18:
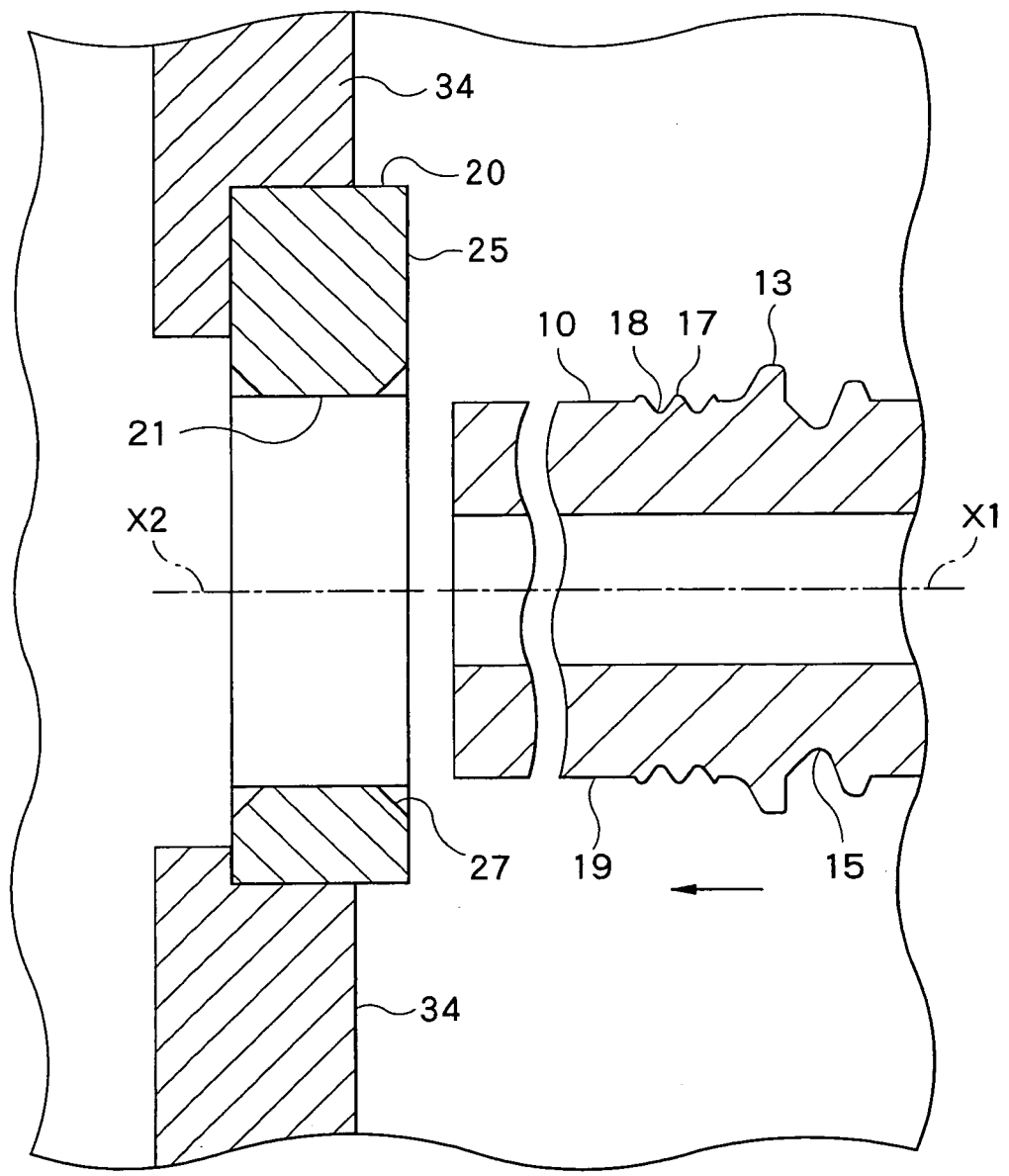
FIG. 18 is a sectional front view showing a state immediately before the preliminary shaft is inserted into a shaft hole of the cam lobe, in the second embodiment of the present invention.
Figure 19:
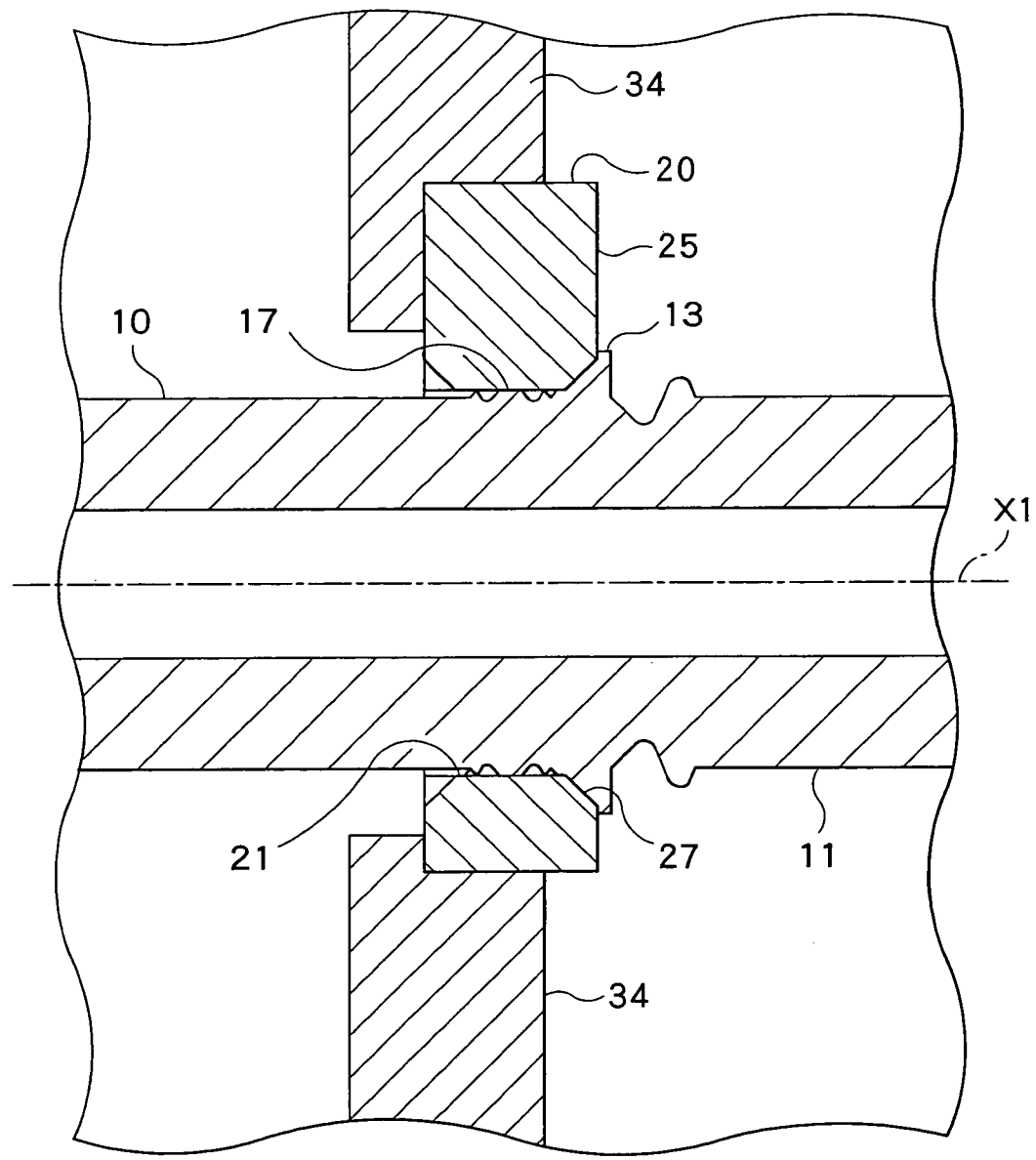
FIG. 19 is a sectional front view showing a state in which the preliminary shaft is inserted in the shaft hole of the cam lobe, with a one-side surface of the cam lobe being pressed onto a one-side projecting part, so that the preliminary shaft and the cam lobe are temporarily fixed to each other, in the second embodiment of the present invention.

FIGS. 16 to 19 relate to a second embodiment. FIG. 16 is a sectional front view showing a state in which a cam lobe has been assembled to a preliminary shaft by a second embodiment of the present invention. FIG. 17 is a sectional front view showing a state in which an outer circumference of the preliminary shaft is pressed by a pressing member so that an other-side projecting part and a partial projecting part are formed, in the second embodiment of the present invention. FIG. 18 is a sectional front view showing a state immediately before the preliminary shaft is inserted into a shaft hole of the cam lobe, in the second embodiment of the present invention. FIG. 19 is a sectional front view showing a state in which the preliminary shaft is inserted in the-shaft hole of the cam lobe, with a one-side surface of the cam lobe being pressed onto a one-side projecting part, so that the preliminary shaft and the cam lobe are temporarily fixed to each other, in the first embodiment of the present invention.

Figure 20:
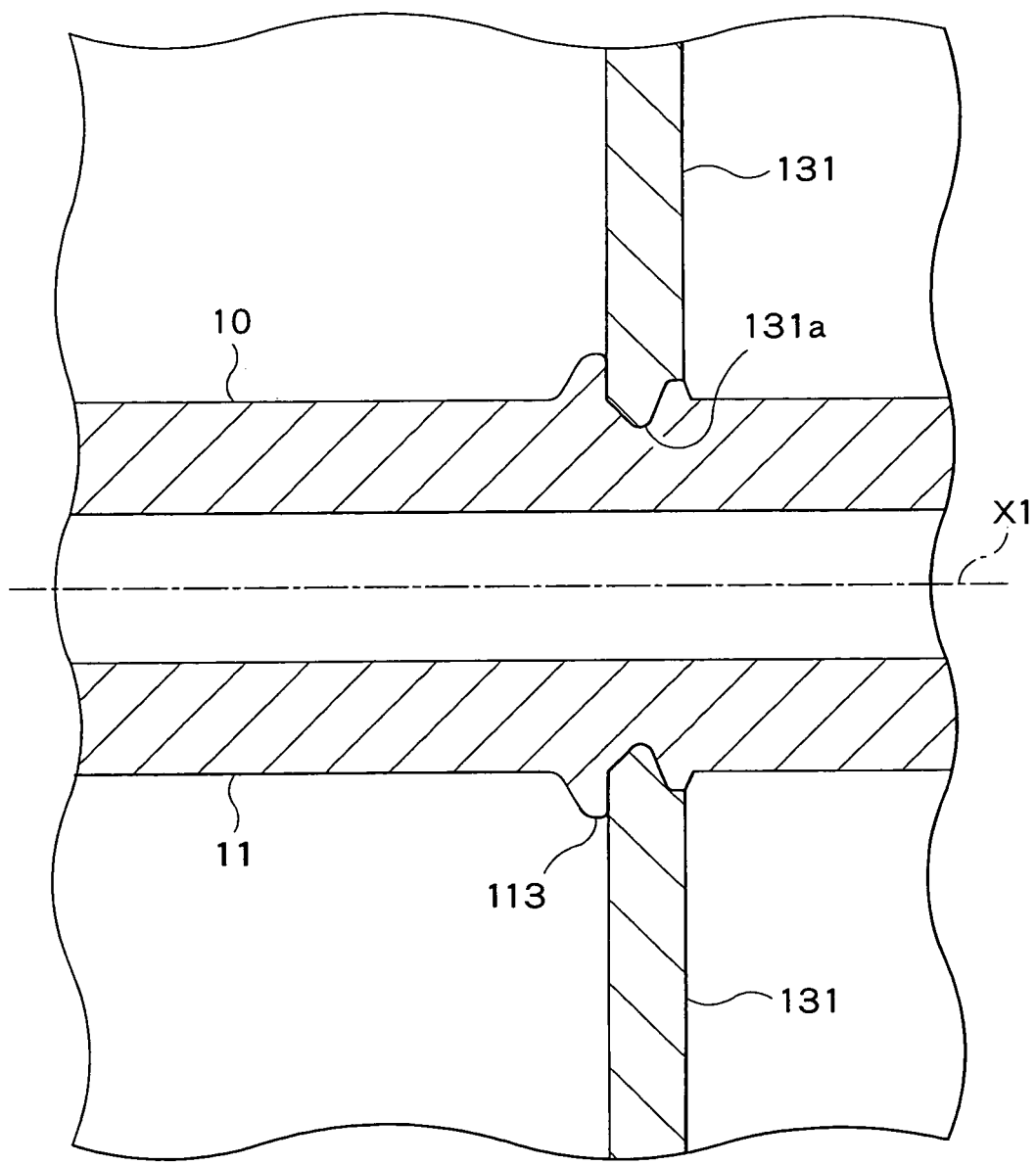
FIG. 20 is a sectional front view showing a state in which an outer circumference of a preliminary shaft is pressed by a pressing member so that a one-side projecting part is formed, in a third embodiment of the present invention.
Figure 21:
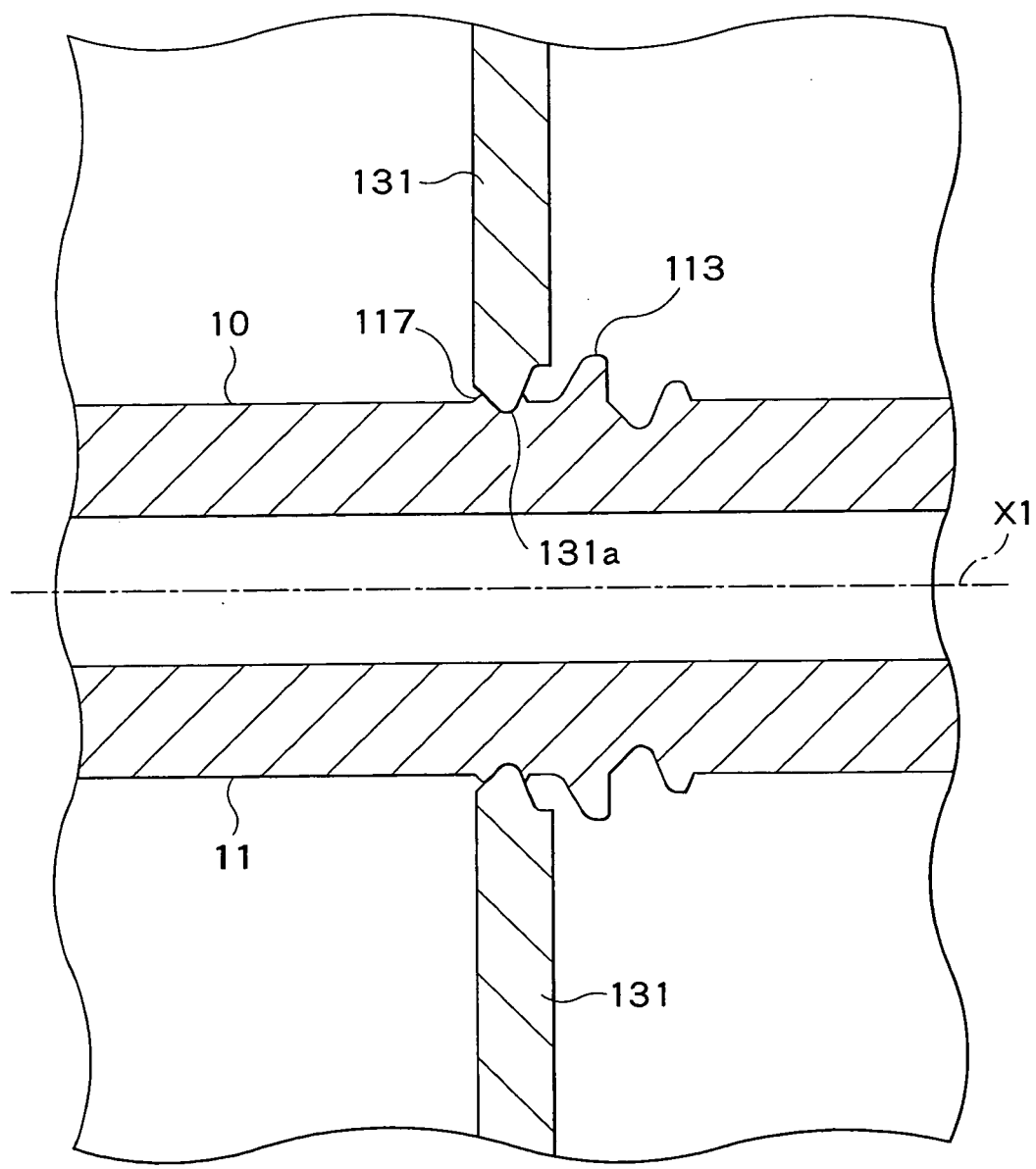
FIG. 21 is a sectional front view showing a state in which the outer circumference of the preliminary shaft is pressed by the pressing member so that a shaft-hole projecting part is formed, in the third embodiment of the present invention.

FIGS. 20 and 21 relate to a third embodiment. FIG. 20 is a sectional front view showing a state in which an outer circumference of a preliminary shaft is pressed by a pressing member so that a one-side projecting part is formed, in a third embodiment of the present invention. FIG. 21 is a sectional front view showing a state in which the outer circumference of the preliminary shaft is pressed by the pressing member so that a shaft-hole projecting part is formed, in the third embodiment of the present invention.

Figure 22:
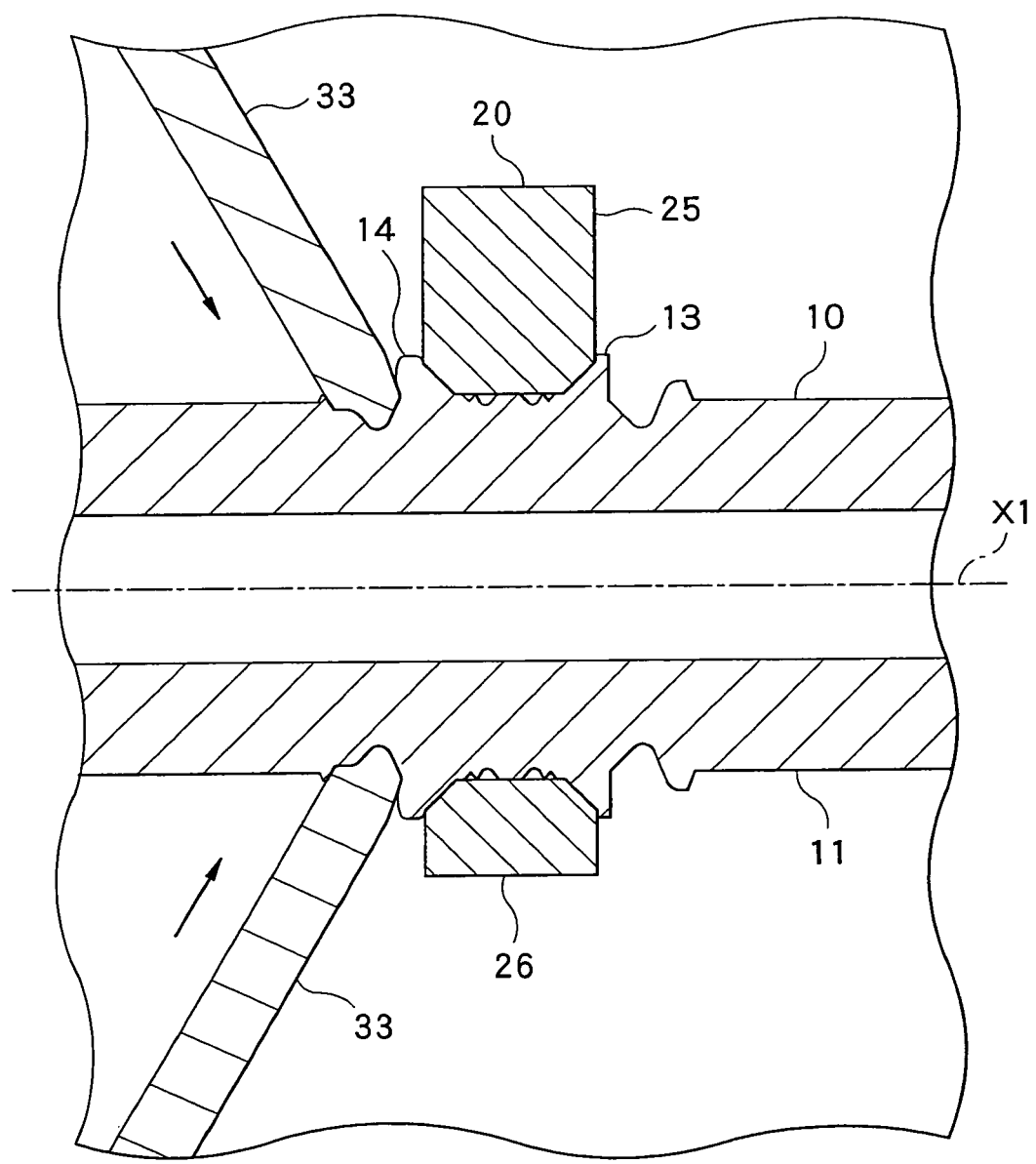
FIG. 22 is sectional front view showing a state in which an outer circumference of a preliminary shaft is pressed by a pressing member so that an other-side projecting part is formed, in a fourth embodiment of the present invention.

FIG. 22 is sectional front view showing a state in which an outer circumference of a preliminary shaft is pressed by a pressing member so that an other-side projecting part is formed, in a fourth embodiment of the present invention.

Figure 23:
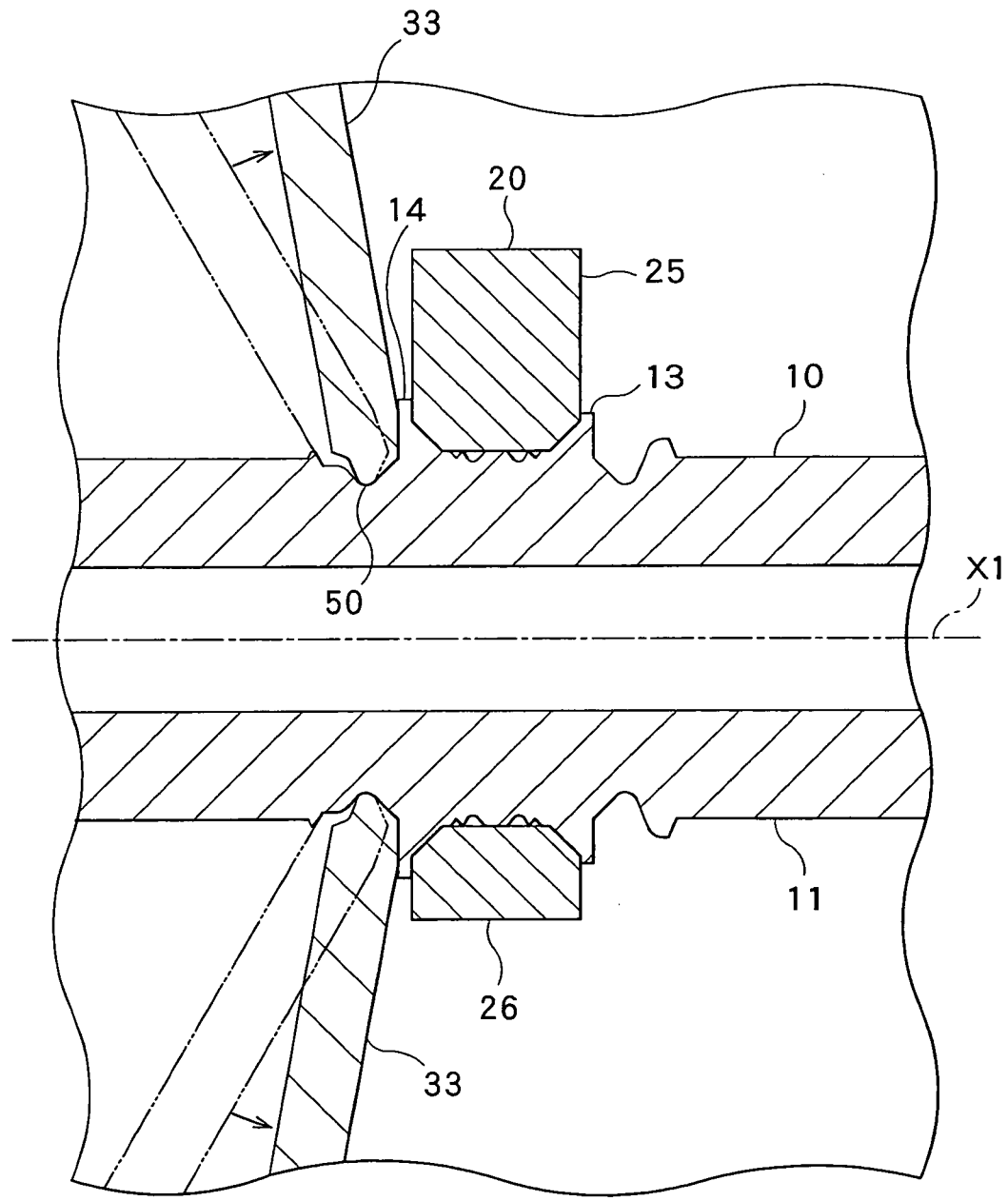
FIG. 23 is sectional front view showing a state in which an outer circumference of a preliminary shaft is pressed by a pressing member so that an other-side projecting part is formed, in a fifth embodiment of the present invention.

FIG. 23 is sectional front view showing a state in which an outer circumference of a preliminary shaft is pressed by a pressing member so that an other-side projecting part is formed, in a fifth embodiment of the present invention.

Figure 24:
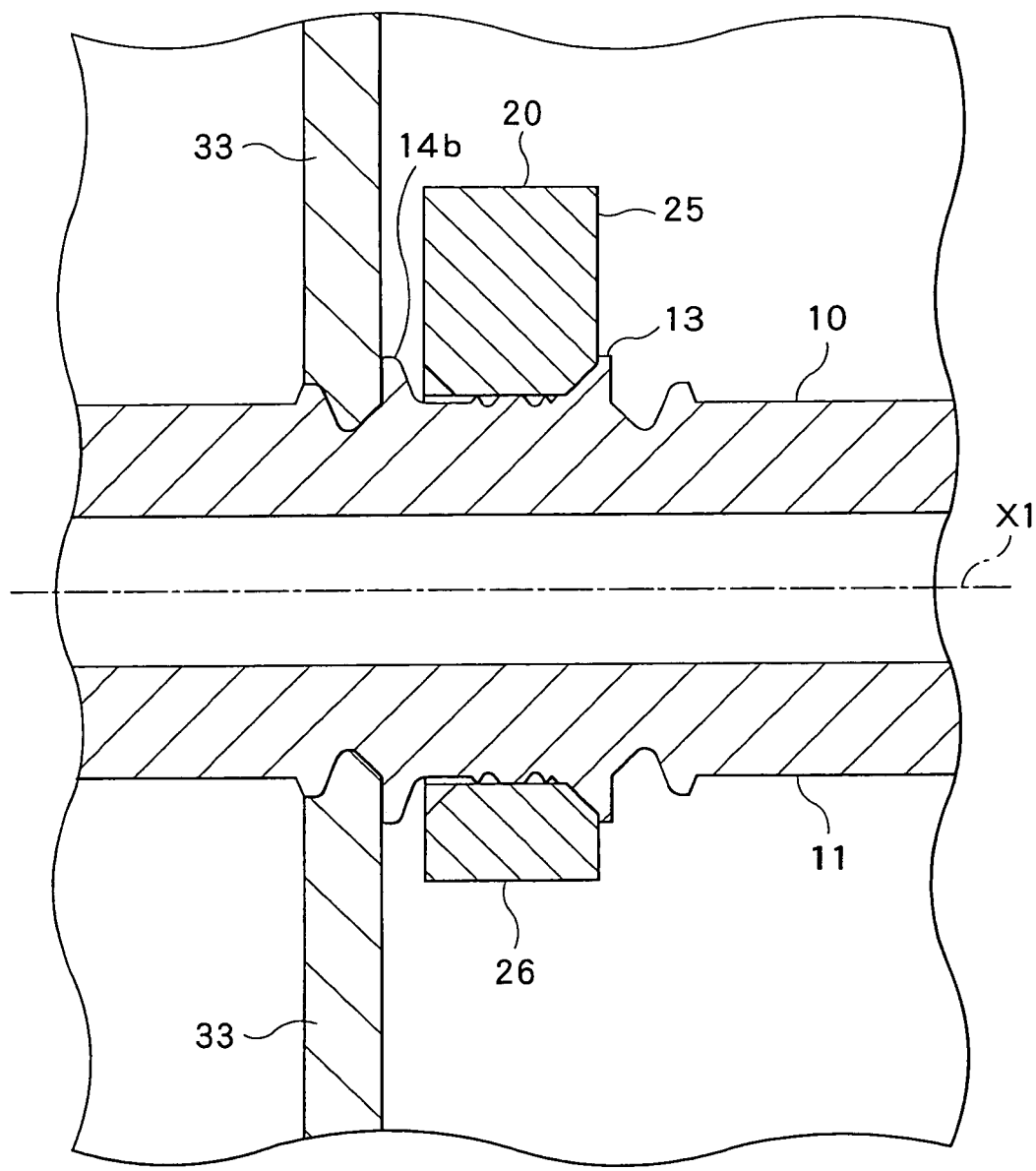
FIG. 24 is sectional front view showing a state in which an outer circumference of a preliminary shaft is pressed by a pressing member so that a preliminary other-side projecting part is formed, in a sixth embodiment of the present invention.
Figure 25:
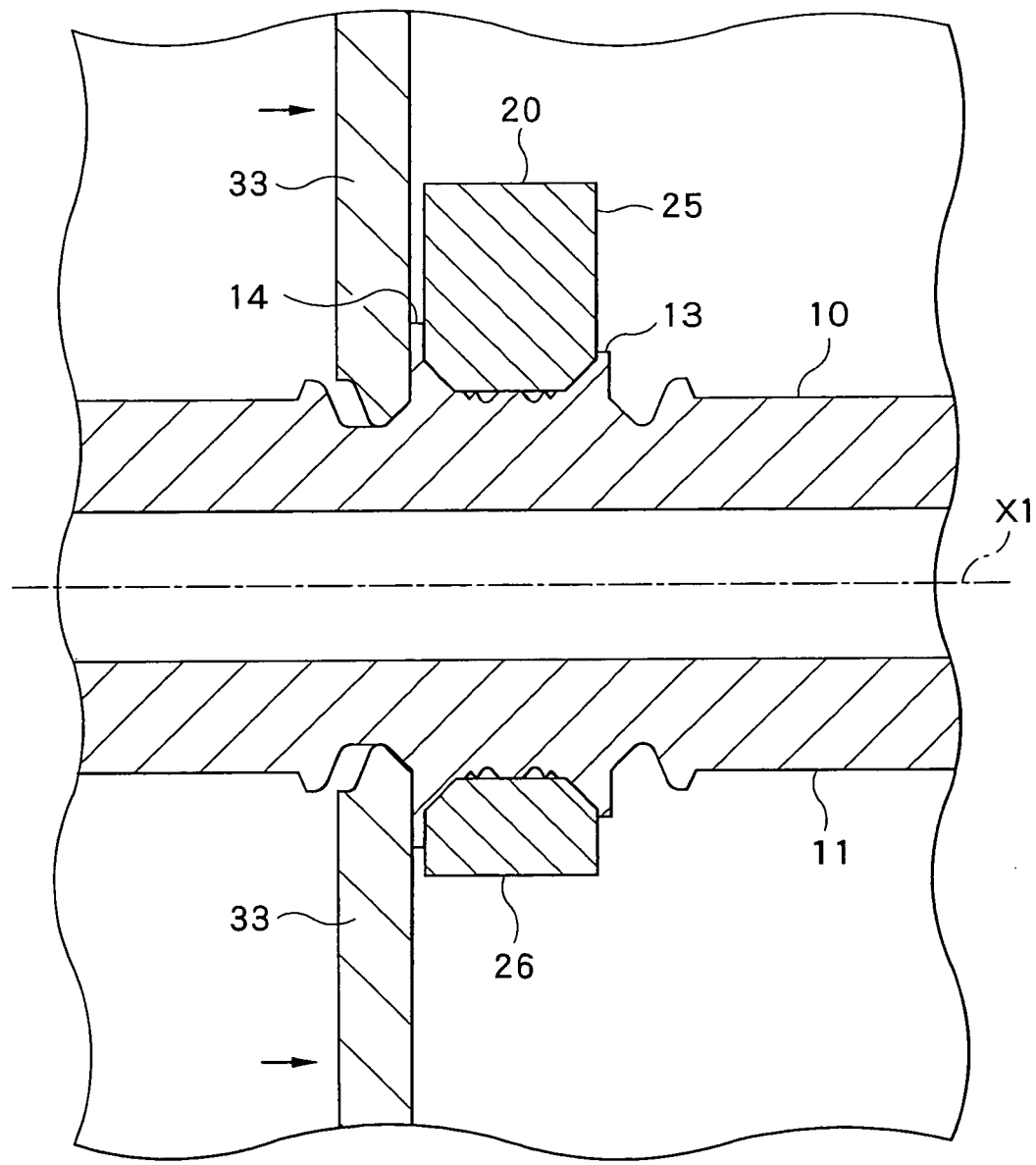
FIG. 25 is a sectional front view showing a state in which the outer circumference of the preliminary shaft is further pressed by the pressing member in accordance with an axial movement thereof so that an other-side projecting part is formed, in the sixth embodiment of the present invention.

FIGS. 24 and 25 relate to a sixth embodiment. FIG. 24 is sectional front view showing a state in which an outer circumference of a preliminary shaft is pressed by a pressing member so that a preliminary side projecting part is formed, in a sixth embodiment of the present invention. FIG. 25 is a sectional front view showing a state in which the outer circumference of the preliminary shaft is further pressed by the pressing member in accordance with an axial movement thereof so that an other-side projecting part is formed, in the sixth embodiment of the present invention.

At first, a cam shaft 1 is described with reference to FIGS. 1 to 9. As shown in FIG. 1, the cam shaft 1 includes a shaft 2 extending in an axial direction, and a plurality of cam lobes 20 or a plurality of journals 3 that are assembled to the shaft 2 at predetermined intervals therebetween in the axial direction.

As shown in FIG. 9, the shaft 2 is provided with, on its outer circumferential part 11, a one-side projecting part 13 for a one-side surface 25 of the cam lobe 20, and an other-side projecting part 14 for an other-side surface 26 of the cam lobe 20. As described below, the one-side projecting part 13 is adapted to be joined to the one-side surface 25 of the cam lobe 20, a fitting recess 27, and an axial end of a cam-lobe shaft hole 21, while the other-side projecting part 14 is adapted to be joined to the other-side surface 26 of the cam lobe 20, a fitting recess 27, and the other axial end of the cam-lobe shaft hole 21 of the cam lobe 20.

Although not shown, similarly to the case of the cam lobe 20, the journal 3 is provided with a one-side projecting part for a one-side surface of the cam lobe 20 and an other-side projecting part for an other-side surface of the cam lobe 20.

As shown in FIGS. 2A and 2B, a preliminary shaft 10, to which a plurality of cam lobes 20 (and/or journals 3) are assembled, is a shaft member of a pipe-like shape including: an outer circumferential part 11 having a diameter smaller than that of the cam-lobe shaft hole 21 of the cam lobe 20, which is described below, (and/or that of a journal shaft hole (not shown) of the journal 3); and a through hole 12 extending in a direction of an axis line X1 of the preliminary shaft 10.

As shown in FIG. 3, the cam lobe 20 has an outer circumferential part 22 of a non-circular shape, which is formed of a base part 23 having a semi-circular shape and a cam top part 24 projecting outward from the base part 23. When viewed from a direction of an axis line X2 of the cam lobe 20, the cam lobe 20 has a one-side surface 25 on a one side thereof and the other-side surface 26 on the other side thereof. In addition, the cam-lobe shaft hole 21, which is adapted to be joined to the outer circumferential part 11 of the preliminary shaft 10, is formed so as to pass through the cam lobe 20 in the direction of the axis line X2 of the cam lobe 20. At the cam-lobe shaft hole 21 on the one-side surface 25 of the cam lobe 20, and at the cam-lobe shaft hole 21 on the other-side surface 26 of the cam lobe 20, there are circumferentially formed a plurality of fitting recesses 27 at predetermined intervals therebetween, in order that rotation of the cam lobe 20 with respect to the preliminary shaft 10 is prevented by portions of a one-side projecting part, which is described below, and portions of an other-side projecting part, which is also described below, entering the inside of the plurality of fitting recesses 27.

Although not shown, similarly to the case of the cam lobe 20, the journal 3 has a one-side surface on a one side thereof and the other-side surface on the other side thereof, when viewed from a direction of an axis line of the journal 3. In addition, a journal shaft hole, which is adapted to be joined to the outer circumferential part 11 of the preliminary shaft 10, is formed so as to pass through the journal 3 in the direction of the axis line of the journal 3. At the journal shaft hole on the one-side surface of the journal 3, and at the journal shaft hole on the other-side surface of the journal 3, there are circumferentially formed a plurality of fitting recesses at predetermined intervals therebetween, in order that rotation of the journal 3 with respect to the preliminary shaft 10 is prevented by portions of the one-side projecting part, which is described below, and portions of the other-side projecting part, which is also described below, entering the inside of the plurality of fitting recesses.

Next, with reference to FIGS. 4, 7 and 10, there is described an assembling apparatus 30 for assembling the cam lobe(s) 20 and/or the journal(s) 3 to the outer circumferential part 11 of the preliminary shaft 10.

As shown in FIG. 10, the preliminary shaft 10 is supported on a central shaft fixing table, not shown, of the assembling apparatus 30, such that the preliminary shaft 10 can be rotated about the axis line X1. At positions spaced apart from the axis line X1 of the preliminary shaft 10, there are disposed a pair of upper and lower pressing members 31 (first pressing members) for the one-side surface 25 such that the pressing members 31 can be rotated about respective axis lines X3 that are parallel to the axis line X1. The pressing members 31 are configured to form a one-side projecting part 13 and a one-side recess 15 for the one-side surface 25 on the outer circumferential part 11 of the preliminary shaft 10. Similarly, there are disposed a pair of upper and lower pressing members 33 (second pressing members) for the other-side surface 26 such that the pressing members 33 can be rotated about respective axis lines X4 that are parallel to the axis line X1. The pressing members 33 are configured to form an other-side projecting part 14 and an other-side recess 16 for the other-side surface 26 on the outer circumferential part 11 of the preliminary shaft 10.

As shown in FIG. 4, each of the pressing members 31 for the one-side surface 25 has a protrusion 31a that protrudes in an outer circumferential direction thereof. The protrusion 31a has a larger tapered portion 31d that moves and guides a material (of the outer circumferential part 11) so as to form the one-side projecting part 13 for the one surface 25, and an axis-line perpendicular portion 31e that is continuous to the larger tapered portion 31d and perpendicular to the axis line X3.

Similarly, as shown in FIG. 7, each of the pressing members 33 for the other-side surface 26 has a protrusion 33a that protrudes in an outer circumferential direction thereof. The protrusion 33a has a larger tapered portion 33d that moves and guides a material (of the outer circumferential part 11) so as to form the other-side projecting part 14 for the other-side surface 26, and an axis-line perpendicular portion 33e that is continuous to the larger tapered portion 33d and perpendicular to the axis line X4.

In addition, as shown in FIG. 10, at positions above and below the preliminary shaft 10 located (rotatably supported) at the central position of the assembling apparatus 30, there are disposed a pair of positioning members 34 that can be moved upward and downward. The positioning members 34 are configured to circumferentially position the cam lobe 20 with respect to the preliminary shaft 10 at a predetermined angle, when the one-side surface 25 of the cam lobe 20 is pressed against the one-side projecting part 13 for the one-side surface 25 of the preliminary shaft 10.

Next, with reference to FIGS. 4 to 15, details of a method of assembling the cam lobes 20 and the journals 3 to the preliminary shaft 10 are described.

At first, as shown in FIG. 10, the preliminary shaft 10 is supported on the central shaft fixing table, not shown but located at the center of the assembling apparatus 30, such that the preliminary shaft 10 can be rotated about the axis line X1 thereof. Following thereto, as shown in FIG. 10, each of the upper and lower pressing members 31 for the one-side surface 25 is rotated about the axis line X3 thereof in the direction shown by the arrow.

Thereafter, as shown in FIG. 11, the pressing members 31 for the one-side surface 25, while the same are being rotated, are moved toward predetermined positions above and below the preliminary shaft 10.

Then, as shown in FIGS. 4 and 12, the first upper and lower pressing members 31 are further moved toward the preliminary shaft 10, and the protrusions 31a of the pressing members 31, which are being rotated, press the outer circumferential part 11 of the preliminary shaft 10 (the preliminary shaft 10 is subjected to a frictional force generated by the rotation of the pressing members 31, and thus is also rotated). Accordingly, a material (a part of the material) at the surface of the outer circumferential part 11 of the preliminary shaft 10 is moved and guided by the larger tapered portion 31d and the axis-line perpendicular portion 31e of each of the pressing members 31 so as to be extruded in the radially outward direction, whereby the side projecting part 13 for the one-side surface 25 is formed. When the material is extruded by the protrusion 31a, the one side recess 15 is also formed in the outer circumferential part 11 of the preliminary shaft 10 (see, FIG. 4). After that, the upper and lower pressing members 31 are retracted to the original positions, and the rotation thereof is stopped.

In the above manner, when the material is extruded by the protrusion 31a, although only the pressing members 31 are driven in rotation, the preliminary shaft 10 may be positively driven in rotation at the equal speed and in the same direction. Alternatively, the preliminary shaft 10 may be positively rotated at a different speed. Reversely, the pressing member 31 may not be positively rotated, but the preliminary shaft 10 may be positively rotated. It is important that the one-side projecting part 13 is formed to have a shape that is circumferentially not irregular (that is circumferentially uniform). As long as this condition is satisfied, various manners can be adopted. From the viewpoint of this condition, the number of relative rotations of the preliminary shaft 10 with respect to the pressing members 31 may be one, but it is preferable that the number of relative rotations is plural (it is preferable that the pressing members 31 gradually press the preliminary shaft 10 during the plurality of rotations).

Thereafter, as shown in FIGS. 5 and 13, the cam lobe 20 is positioned at a predetermined angle about the shaft center X2 of the cam lobe 20, by the positioning members 34 of the assembling apparatus 30. Then, the preliminary shaft 10, on which the one projecting part 13 for the one surface 25 has been formed, is inserted into the cam-lobe shaft hole 21 from the side of a non-projecting part 19 of the preliminary shaft 10 on which the one-side projecting part 13 is not formed.

Thereafter, as shown in FIG. 6, the one-side surface 25 of the inserted cam lobe 20 is pressed against the one-side projecting part 13. Namely, the one-side projecting part 13 for the one-side surface 25 is plastically deformed so that the one-side projecting part 13 is joined to the one-side surface 25 of the cam lobe 20, to the cam-lobe fitting recesses 27 on the side of the one-side surface 25 of the cam lobe 20, and to a one end of the cam-lobe shaft hole 21 of the cam lobe 20. At that time, the cam lobe 20 is moved while the preliminary shat 10 is fixed, or the preliminary shaft 10 is moved while the cam lobe 20 is fixed. Thus, the cam lobe 20 is temporarily fixed to the preliminary shaft 10, such that the cam lobe 20 and the preliminary shaft 10 are circumferentially positioned. When the one-side surface 25 is pressed against the one-side projecting part 13, rotation of the preliminary shaft 10 is stopped and also rotation of the cam lobe 210 is stopped.

Following thereto, as shown in FIGS. 7 and 14, the second upper and lower pressing members 33 are moved toward the preliminary shaft 10, and the protrusions 33a of the pressing members 33 for the other-side surface 26, while the same are being rotated, press the outer circumferential part 11 of the preliminary shaft 10 (the preliminary shaft 10 is subjected to a frictional force generated by the rotation of the pressing members 33, and thus is also rotated). Accordingly, a material (a part of the material) at the surface of the outer circumferential part 11 of the preliminary shaft 10 is moved and guided by the larger tapered portion 33d and the axis-line perpendicular portion 33e of each of the pressing members 33 so as to be extruded in the radially outward direction, whereby the side projecting part 14 for the other-side surface 26 is formed. Simultaneously with the formation of the other-side projecting part 14, the other-side projecting part 14 is joined to the other-side surface 26 of the cam lobe 20, to the cam-lobe fitting recesses 27 on the side of the other-side surface 26 of the cam lobe 20, and to the other end of the cam-lobe shaft hole 21 of the cam lobe 20. When the material is extruded by the protrusion 33a, the other side recess 16 is also formed in the outer circumferential part 11 of the preliminary shaft 10 (see, FIG. 7). After that, the upper and lower pressing members 33 are retracted to the original positions, and the rotation thereof is stopped.

In the above manner, when the material is extruded by the protrusion 33a, although only the pressing members 33 are driven in rotation, the preliminary shaft 10 may be positively driven in rotation at the equal speed and in the same direction. Alternatively, the preliminary shaft 10 may be positively rotated at a different speed. Reversely, the pressing member 33 may not be positively rotated, but the preliminary shaft 10 may be positively rotated. It is important that the fastening force between the cam lobe 20 and the preliminary shaft 10 is sufficiently increased by the other-side projecting part 14 under the temporary fixing state (circumferentially positioning state) of the preliminary shaft 10 and the cam lobe 20 is maintained, and that the other-side projecting part 14 is formed to have a shape that is circumferentially not irregular (that is circumferentially uniform). As long as these conditions are satisfied, various manners can be adopted.

In order to maintain the temporary fixing state of the preliminary shaft 10 and the cam lobe 20, it may be preferable that, when the material is initially extruded by the protrusion 33a, neither the pressing members 33 nor the preliminary shaft 10 is rotated. In this case, after the material has been partially extruded by the protrusion 33a in the first place, the relative rotations of the pressing members 33 and the preliminary shaft 10 are started, and the material is extruded over all the circumference of the preliminary shaft 10.

The number of relative rotation of the preliminary shaft 10 with respect to the pressing members 33 may be one, but it is preferable that the number of relative rotations is plural (it is preferable that the pressing members 33 gradually press the preliminary shaft 10 during the plurality of rotations).

In the manner as described above, the operation for assembling the one cam lobe 20 to the preliminary shaft 10 is completed. By repeating the aforementioned operation for assembling the cam lobe 20 (or the journal 3) to the preliminary shaft 10, the cam shaft 1 is formed.

As described above, according to the present invention, since the one-side projecting part 13 is formed before the insertion of the preliminary shaft 10, the one-side projecting part 13 can be formed with higher degree of freedom. Further, since the one-side surface 25 of the cam lobe 20 that has been inserted in the preliminary shaft 10 is pressed against the one-side projecting part 13 so that the cam lobe 20 and the preliminary shaft 10 are temporarily fixed to each other, the cam lobe 20 and the preliminary shaft 10 can be circumferentially positioned. Under this state, the other-side projecting part 14 is subsequently formed. Thus, no other means is required for circumferentially positioning the cam-lobe 20 and the preliminary shaft 10. Thus, the other-side projecting part 14 can be formed with higher degree of freedom. As a result, there can be easily formed the one-side projecting part 13 and the other-side projecting part 14 capable of realizing a sufficient fastening force between the cam lobe 20 and the preliminary shaft 10.

Next, the second embodiment of the present invention is described with reference to FIGS. 16 to 19.

As shown in FIG. 16, a shaft 2 of a cam shaft which is formed in this embodiment is provided with, at an outer circumferential part 11 thereof, a one-side projecting part 13 for a one-side surface 25 of a cam lobe 20, and an other-side projecting part 14 for an other-side surface 26 of the cam lobe 20. As described below, the one-side projecting part 13 is adapted to be joined to the one-side surface 25 of the cam lobe 20, a fitting recess 27, and an axial end of a cam-lobe shaft hole 21, while the other-side projecting part 14 is adapted to be joined to the other-side surface 26 of the cam lobe 20, a fitting recess 27, and the other axial end of the cam-lobe shaft hole 21. In addition, the shaft 2 has a circumferential one-side recess 15 at a position outside the cam-lobe shaft hole 21 adjacent to the one-side projecting part 13 for the one surface 25, and also a circumferential other-side recess 16 at a position outside the cam-lobe shaft hole 21 adjacent to the other-side projecting part 14 for the other-side surface 26.

Further, the shaft 2 in this embodiment has a partial projecting part 17 that is press-inserted into the cam-lobe shaft hole 21, and shaft-hole recesses 18 adjacent to the partial projecting part 17.

Although not shown, similarly to the case of the cam lobe 20, a journal 3 is provided with a one-side projecting part for a one side thereof, a one-side recess, an other-side projecting part for the other-side surface thereof, an other-side recess, a partial projecting part, and shaft-hole recesses.

Next, the shape of an outer circumferential part 11 of a preliminary shaft 10 in this embodiment is described in detail.

As shown in FIG. 17, a pressing member 31 has, on its outer circumference, a larger-diameter protrusion 31a, smaller-diameter protrusions 31b having a diameter smaller than that of the larger-diameter protrusion 31a, and a dent 31c for avoiding the one-side projecting part 13 for the one-side surface 25 formed on the outer circumference 11 of the preliminary shaft 10.

The larger-diameter protrusion 31a has a larger tapered portion 31d that moves and guides a material (of the outer circumferential part 11) so as to form the one-side projecting part 13 for the one surface 25, and an axis-line perpendicular portion 31e that is continuous to the larger tapered portion 31d and perpendicular to an axis line 3. On the other hand, the smaller-diameter protrusion 31b has a smaller tapered portion 31f that moves and guides a material (of the outer circumferential part 11) so as to form the partial projecting part 17.

By pressing the outer circumferential part 11 of the preliminary shaft 10 by means of the above pressing members 31, formed on the outer circumferential part 11 of the preliminary shaft 10 are the one-side projecting part 13 for the one-side surface 25, the one side recess 15, the partial projecting part 17, and the shaft-hole recesses 18. The partial projecting part 17 is formed to have the same diameter as an inner diameter of the cam-lobe shaft hole 21 or to have a diameter larger than the inner diameter of the cam-lobe shaft hole 21.

Following thereto, as shown in FIGS. 18 and 19, the cam lobe 20 is positioned at a predetermined angle about a shaft center X2 of the cam lobe 20. Then, the preliminary shaft 10, on which the one-side projecting part 13 for the one-side surface 25 and the partial projecting part 17 have been formed, is inserted into the cam-lobe shaft hole 21 from a non-projecting part 19 of the preliminary shaft 10 on which the one-side projecting part 13 and the partial projecting part 17 are not formed. At this time, since the partial projecting part 17 has the same diameter as the inner diameter of the cam-lobe shaft hole 21 or has a diameter larger than the inner diameter of the cam-lobe shaft hole 21, the cam lobe 20 is centered by the partial projecting part 17. Thus, while the shaft center X2 of the cam lobe 20 and the shaft center X1 of the preliminary shaft 10 are aligned with each other, the one-side surface 25 of the cam lobe 20 is pressed against the one-side projecting part 13 for the one-side surface 25. Since the partial projecting part 17 is not disposed over all an axial area of the outer circumferential part 11 opposed to the inner surface of the cam-lobe shaft hole 12, and since the diameter of the partial projecting part 17 is smaller than that of the one-side projecting part 13, problems such as a too-high press-insertion load are removed.

Since the succeeding steps for forming the other-side projecting part 14 and the like are the same as those of the first embodiment, description thereof is omitted.

As described above, before the inserting step, the partial projecting part 17, which has the same diameter as the inner diameter of the cam-lobe shaft hole 21 or a diameter larger than the inner diameter of the cam-lobe shaft hole 21, is formed at only a partial area of the outer circumferential part 11 of the preliminary shaft 10 opposed to the inner surface of the cam-lobe shaft hole 21. In this case, it is easy to align the shaft center X2 of the cam lobe 20 and the shaft center X1 of the preliminary shaft 10 with each other, whereby a precision of the cam shaft to be formed can be improved.

In the second embodiment, the pressing member 31 for the one-side surface 25 has the larger-diameter protrusion 31a and the smaller-diameter protrusion 31b, so that the one-side projecting part 13 for the one-side surface 25 and the partial projecting part 17 are simultaneously formed. However, the present invention is not limited thereto.

In the third embodiment of the present invention, as shown in FIG. 20, a pressing member 131 for a one-side surface 25 has only a larger-diameter protrusion 131a. After a one-side projecting part 113 for the one-side surface 25 has been formed, as shown in FIG. 21, the pressing member 131 for the one-side surface 25 is separated from the outer circumferential part 11 of the preliminary shaft 10, and the pressing member 131 is moved to another predetermined axial position of the outer circumferential part 11 of the preliminary shaft 10, which is to be inside a cam-lobe shaft hole 21. Then, by pressing the outer circumferential part 11 of the preliminary shaft 10 at this position, a partial projecting part 117 is formed.

Furthermore, in the first embodiment, the pressing member 31 for the one-side surface 25 and the pressing member 33 for the other-side surface 26 are moved in a direction perpendicular to the axis line X1 of the preliminary shaft 10, and thus the one-side projecting part 13 for the one-side surface 25 and the other-side projecting part 14 for the other-side surface 26 are formed by pressing.

On the other hand, in the fourth embodiment, as shown in FIG. 22, a pressing member for the other-side surface 26 presses the predetermined position of the outer circumferential part 11 of the preliminary shaft 10 from a diagonal direction that is inclined with respect to a direction perpendicular to the axis line X1 of the preliminary shaft 10, so as to form the other-side projecting part 14 for the other-side surface 26. In this case, it is easy to increase a projecting amount of the other-side projecting part 14 for the other-side surface 26. This embodiment can be applied to the pressing member 31 for the one-side surface 25, similarly to the case of the pressing member 33 for the other-side surface 26.

In addition, in the fifth embodiment, as shown in FIG. 23, a pressing member for the other-side surface 26 presses a predetermined position of the outer circumference 11 of the preliminary shaft 10 from a diagonal direction that is inclined with respect to a direction perpendicular to the axis line X1 of the preliminary shaft 10, and then the pressing member 33 is further inclined about an end 50 of the pressing member 33 in a direction of the other-side surface 26 of the cam lobe 20, so as to form the other-side projecting part 14 for the other-side surface 26. Also in this case, it is easy to increase a projecting amount of the other-side projecting part 14 for the other-side surface 26. This embodiment can be applied to the pressing member 31 for the one-side surface 25, similarly to the case of the pressing member 33 for the other-side surface 26.

In the sixth embodiment, as shown in FIG. 24, a pressing member 33 for the other-side surface 26 firstly presses a predetermined position of the outer circumferential part 11 of the preliminary shaft 10 from a direction perpendicular to the axis line X1 of the preliminary shaft 10, so as to form a preliminary other-side projecting part 14b. After that, as shown in FIG. 25, the pressing member 33 is moved in a direction of the other-side surface 26 of the cam lobe 20, so as to form the other-side projecting part 14 for the other-side surface 26. Also in this case, it is easy to increase a projecting amount of the other-side projecting part 14 for the other-side surface 26. This embodiment can be applied to the pressing member 31 for the one-side surface 25, similarly to the case of the pressing member 33 for the other-side surface 26.

Moreover, the preliminary shaft 10 may be solid without the through-hole 12, although it is preferable that the preliminary shaft 10 has the through-hole 12 for the purpose of weight saving. In the fourth to six embodiments, the partial projecting part 17 may be formed or may not be formed.

The invention claimed is:

1. A method of forming a cam shaft by assembling a preliminary shaft having a predetermined outer diameter and a cam lobe including a cam-lobe shaft hole having a diameter larger than the outer diameter of the preliminary shaft, the method comprising the sequential steps of:
   (1) a first projecting-part forming step in which a first projecting part for fixing a first side surface of the cam lobe is formed on an axially predetermined position of the preliminary shaft by plastically deforming the predetermined position of the preliminary shaft upward and in a radially outward direction;
   (2) an inserting step in which the preliminary shaft is inserted into the cam-lobe shaft hole of the cam lobe from a side of the preliminary shaft on which the first projecting part has not been formed so that the first projecting part abuts the first side surface of the cam lobe;
   (3) a temporary fixing step in which the cam lobe and the preliminary shaft are temporarily fixed to each other, wherein a positioning member holds a second side surface and an outer circumferential part of the inserted cam lobe, and presses the first side surface of the inserted cam lobe against a side surface of the first projecting part which has already been formed on the predetermined position of the preliminary shaft by plastic deformation, such that the first projecting part is further plastically deformed, so that the cam lobe is circumferentially positioned with respect to the preliminary shaft and joined to the preliminary shaft in association with the two plastic deformations;

(4) a disengaging step in which the positioning member is disengaged from the cam lobe; and (5) a second projecting-part forming step in which a second projecting part for fixing the second side surface of the cam lobe is formed on an outer circumferential part of the preliminary shaft near the second side surface of the cam lobe that was temporarily fixed during the temporary fixing step.

2. The method of forming a cam shaft according to claim 1, wherein in the first projecting-part forming step, the first projecting part is formed by a first pressing member having a diameter larger than that of the cam-lobe shaft hole, and in the second projecting-part forming step, the second projecting part is formed by a second pressing member having a diameter larger than that of the cam-lobe shaft hole.

3. The method of forming a cam shaft according to claim 2, wherein the first pressing member is a member configured to be rotated about an axis that is parallel to an axial direction of the preliminary shaft, and/or the second pressing member is a member configured to be rotated about an axis that is parallel to the axial direction of the preliminary shaft, and in the first projecting-part forming step, the first pressing member, while the first pressing member being rotated, presses the axially predetermined position of the preliminary shaft, so that the first projecting part having a diameter larger than that of the cam-lobe shaft hole is formed, and/or in the second projecting-part forming step, the second pressing member, while the second pressing member being rotated, presses another axially predetermined position of the preliminary shaft, so that the second projecting part having a diameter larger than that of the cam-lobe shaft hole is formed.

4. The method of forming a cam shaft according to claim 3, wherein in the first projecting-part forming step, the preliminary shaft is held so as to be axially rotated, and is configured to be rotated together with the rotation of the first pressing member, and/or in the second projecting-part forming step, the preliminary shaft is held so as to be axially rotated, and is configured to be rotated together with the rotation of the second pressing member.

5. The method of forming a cam shaft according to claim 4, wherein in the first projecting-part forming step, the number of rotations of the preliminary shaft relative to the first pressing member is plural, and/or in the second projecting-part forming step, the number of rotations of the preliminary shaft relative to the second pressing member is plural.

6. The method of forming a cam shaft according to claim 2, wherein in the first projecting-part forming step, the preliminary shaft is held so as to be axially rotated, and/or in the second projecting-part forming step, the preliminary shaft is held so as to be axially rotated, in the first projecting-part forming step, the first pressing member presses the axially predetermined position of the preliminary shaft while the preliminary shaft is being rotated, so that the first projecting part having a diameter larger than that of the cam-lobe shaft hole is formed, and/or in the second projecting-part forming step, the second pressing member presses another axially predetermined position of the preliminary shaft while the preliminary shaft is being rotated, so that the second projecting part having a diameter larger than that of the cam-lobe shaft hole is formed.

7. The method of forming a cam shaft according to claim 2, wherein in the first projecting-part forming step, the first pressing member presses the axially predetermined position of the preliminary shaft from a direction that is inclined with respect to a direction perpendicular to an axial direction of the preliminary shaft, so that the first projecting part having a diameter larger than that of the cam-lobe shaft hole is formed and/or in the second projecting-part forming step, the second pressing member presses another axially predetermined position of the preliminary shaft from a direction that is inclined with respect to a direction perpendicular to the axial direction of the preliminary shaft, so that the second projecting part having a diameter larger than that of the cam-lobe shaft hole is formed.

8. The method of forming a cam shaft according to claim 2, wherein in the first projecting-part forming step, the first pressing member presses the axially predetermined position of the preliminary shaft from a direction that is inclined with respect to a direction perpendicular to an axial direction of the preliminary shaft, and then is further inclined in a direction of the first side surface of the cam lobe, so that the first projecting part having a diameter larger than that of the cam-lobe shaft hole is formed, and/or in the second projecting-part forming step, the second pressing member presses another axially predetermined position of the preliminary shaft from a direction that is inclined with respect to a direction perpendicular to the axial direction of the preliminary shaft, and then is further inclined in a direction of the second side surface of the cam lobe, so that the second projecting part having a diameter larger than that of the cam-lobe shaft hole is formed.

9. The method of forming a cam shaft according to claim 2, wherein the first pressing member is a member capable of being rotated about an axis that is parallel to an axial direction of the preliminary shaft and of being moved in the axial direction, and/or the second pressing member is a member capable of being rotated about an axis that is parallel to the axial direction of the preliminary shaft and being moved in the axial direction, and in the first projecting-part forming step, the first pressing member, while the same is being rotated, presses the axially predetermined position of the preliminary shaft, and then is further moved in a direction of the first side surface of the cam lobe, so that the first projecting part having a diameter larger than that of the cam-lobe shaft hole is formed, and/or in the second projecting-part forming step, the second pressing member, while the same is being rotated, presses another axially predetermined position of the preliminary shaft, and then is further moved in a direction of the second side surface of the cam lobe, so that the second projecting part having a diameter larger than that of the cam-lobe shaft hole is formed.

10. The method of forming a cam shaft according to claim 1, wherein before step 2, a partial part forming step is performed in which a partial projecting part is formed at only a partial area of the outer circumferential part of the preliminary shaft opposed to an inner surface of the cam-lobe shaft, the partial projecting part having the same diameter as that of the cam-lobe shaft hole or a diameter larger than that of the cam-lobe shaft hole.

11. The method of forming a cam shaft according to claim 2, wherein before step 2, a partial part forming step is performed in which a partial projecting part is formed at only a partial area of the outer circumferential part of the preliminary shaft opposed to an inner surface of the cam-lobe shaft, the partial projecting part having the same diameter as that of the cam-lobe shaft hole or a diameter larger than that of the cam-lobe shaft hole.

12. The method of forming a cam shaft according to claim 3, wherein before step 2, a partial part forming step is performed in which a partial projecting part is formed at only a partial area of the outer circumferential part of the preliminary shaft opposed to an inner surface of the cam-lobe shaft, the partial projecting part having the same diameter as that of the cam-lobe shaft hole or a diameter larger than that of the cam-lobe shaft hole.

13. The method of forming a cam shaft according to claim 4, wherein before step 2, a partial part forming step is performed in which a partial projecting part is formed at only a partial area of the outer circumferential part of the preliminary shaft opposed to an inner surface of the cam-lobe shaft, the partial projecting part having the same diameter as that of the cam-lobe shaft hole or a diameter larger than that of the cam-lobe shaft hole.

14. The method of forming a cam shaft according to claim 5, wherein before step 2, a partial part forming step is performed in which a partial projecting part is formed at only a partial area of the outer circumferential part of the preliminary shaft opposed to an inner surface of the cam-lobe shaft, the partial projecting part having the same diameter as that of the cam-lobe shaft hole or a diameter larger than that of the cam-lobe shaft hole.

15. The method of forming a cam shaft according to claim 6, wherein before step 2, a partial part forming step is performed in which a partial projecting part is formed at only a partial area of the outer circumferential part of the preliminary shaft opposed to an inner surface of the cam-lobe shaft, the partial projecting part having the same diameter as that of the cam-lobe shaft hole or a diameter larger than that of the cam-lobe shaft hole.

16. The method of forming a cam shaft according to claim 7, wherein before step 2, a partial part forming step is performed in which a partial projecting part is formed at only a partial area of the outer circumferential part of the preliminary shaft opposed to an inner surface of the cam-lobe shaft, the partial projecting part having the same diameter as that of the cam-lobe shaft hole or a diameter larger than that of the cam-lobe shaft hole.

17. The method of forming a cam shaft according to claim 8, wherein before step 2, a partial part forming step is performed in which a partial projecting part is formed at only a partial area of the outer circumferential part of the preliminary shaft opposed to an inner surface of the cam-lobe shaft, the partial projecting part having the same diameter as that of the cam-lobe shaft hole or a diameter larger than that of the cam-lobe shaft hole.

18. The method of forming a cam shaft according to claim 9, wherein before step 2, a partial part forming step is performed in which a partial projecting part is formed at only a partial area of the outer circumferential part of the preliminary shaft opposed to an inner surface of the cam-lobe shaft, the partial projecting part having the same diameter as that of the cam-lobe shaft hole or a diameter larger than that of the cam-lobe shaft hole.

\* \* \* \* \*